(12) United States Patent
McNeill et al.

(10) Patent No.: US 10,931,769 B2
(45) Date of Patent: Feb. 23, 2021

(54) LOCATION-BASED METHOD AND SYSTEM FOR REQUESTING AND OBTAINING IMAGES

(71) Applicant: Stringr Inc., San Fransicso, CA (US)

(72) Inventors: Brian Patrick McNeill, San Francisco, CA (US); Elizabeth J. Stewart, San Francisco, CA (US)

(73) Assignee: STRINGR INC., San Francisco, CA (US)

( * ) Notice: Subject to any disclaimer, the term of this patent is extended or adjusted under 35 U.S.C. 154(b) by 595 days.

(21) Appl. No.: 14/668,377

(22) Filed: Mar. 25, 2015

(65) Prior Publication Data

US 2016/0134717 A1    May 12, 2016

Related U.S. Application Data

(60) Provisional application No. 62/078,863, filed on Nov. 12, 2014.

(51) Int. Cl.
| | |
|---|---|
| H04L 29/08 | (2006.01) |
| H04W 4/02 | (2018.01) |
| H04W 4/029 | (2018.01) |
| G06F 16/58 | (2019.01) |
| G06F 16/78 | (2019.01) |
| H04W 4/021 | (2018.01) |

(52) U.S. Cl.
CPC .......... *H04L 67/26* (2013.01); *G06F 16/5866* (2019.01); *G06F 16/7867* (2019.01); *H04L 67/18* (2013.01); *H04L 67/20* (2013.01); *H04L 67/22* (2013.01); *H04L 67/306* (2013.01); *H04W 4/021* (2013.01); *H04W 4/023* (2013.01); *H04W 4/025* (2013.01); *H04W 4/029* (2018.02)

(58) Field of Classification Search
CPC ......... H04L 67/26; H04L 67/18; H04L 67/20; H04L 67/22; H04L 67/306; G06F 17/30268; G06F 17/3082; H04W 4/025
USPC ........................................................ 709/217
See application file for complete search history.

(56) References Cited

U.S. PATENT DOCUMENTS

| | | | |
|---|---|---|---|
| 8,086,758 B1 * | 12/2011 | Allan | G06F 9/541 370/352 |
| 9,280,565 B1 * | 3/2016 | Rizk | G06F 16/51 |
| 10,152,695 B1 * | 12/2018 | Chiu | G06Q 10/1053 |
| 2006/0218217 A1 * | 9/2006 | Ganesan | H04N 7/17318 709/200 |
| 2009/0044235 A1 | 2/2009 | Davidson | |

(Continued)

OTHER PUBLICATIONS

Thumbtack, Here's How Thumbtack Works, Jan. 23, 2014 (Year: 2014).*

(Continued)

*Primary Examiner* — Tonia L Dollinger
*Assistant Examiner* — Schquita D Goodwin
(74) *Attorney, Agent, or Firm* — Thompson Coburn LLP; Benjamin L. Volk, Jr.

(57) ABSTRACT

Technology is disclosed for using geographic information that reflects the current locations for a plurality of image providers to find image providers that are capable of fulfilling image requests from image requesters, where the image requests are associated with various geographic locations. In an example embodiment, the technology can be used to find video footage of news events in a timely and cost-efficient manner.

47 Claims, 22 Drawing Sheets

(56) References Cited

U.S. PATENT DOCUMENTS

| | | | |
|---|---|---|---|
| 2009/0222481 A1* | 9/2009 | Fisher | G06Q 10/06 |
| 2011/0107369 A1 | 5/2011 | O'Brien et al. | |
| 2011/0188351 A1* | 8/2011 | Aaron | G06Q 10/109 368/10 |
| 2012/0082226 A1* | 4/2012 | Weber | H04N 7/141 375/240.12 |
| 2012/0148165 A1* | 6/2012 | Yabu | G06K 9/6224 382/225 |
| 2012/0303754 A1* | 11/2012 | Takahashi | G06Q 10/06 709/217 |
| 2012/0315884 A1* | 12/2012 | Forutanpour | H04W 4/026 455/414.2 |
| 2013/0040660 A1* | 2/2013 | Fisher | G06Q 30/02 455/456.1 |
| 2013/0067079 A1* | 3/2013 | Mourtada | G06Q 30/00 709/225 |
| 2013/0124508 A1* | 5/2013 | Paris | G06F 17/3028 707/723 |
| 2013/0135464 A1* | 5/2013 | Kuroki | H04W 4/023 348/135 |
| 2013/0155246 A1* | 6/2013 | Regli | H04N 1/32101 348/159 |
| 2013/0346180 A1* | 12/2013 | Shenk | G06Q 30/0233 705/14.33 |
| 2014/0006420 A1* | 1/2014 | Sparrow | G06F 16/435 707/748 |
| 2014/0025776 A1* | 1/2014 | Salverda | G06F 15/163 709/217 |
| 2015/0127165 A1* | 5/2015 | Quam | F24F 11/63 700/275 |
| 2015/0161877 A1* | 6/2015 | Hamalainen | H04W 4/029 348/158 |
| 2016/0055556 A1* | 2/2016 | Ignatius | G06Q 30/0609 705/26.35 |
| 2016/0127981 A1* | 5/2016 | Shaw | H04L 67/141 370/338 |
| 2016/0134684 A1* | 5/2016 | Tan | G06Q 20/123 709/217 |

OTHER PUBLICATIONS

Fiverr, Terms of Service, Feb. 24, 2015 (Year: 2015).*
Cookies and Tracking Technologies Policy, NBC Universal, retrieved from http://www.nbcuni.com/privacy/cookies/ on Oct. 24, 2014, 3 pages.
Full Privacy Policy, NBC Universal, retrieved from http://www.nbcuni.com/privacy/full-privacy-policy/ on Oct. 24, 2014, 4 pages.
Lee, "NYT: NBC News Buys Stringwire, Hopes to Bring User-Generated Live Video to the News Room", retrieved from http://www.engadget.com/2013/08/11/nbc-news-buys-stringwire/ on Oct. 24, 2014, 5 pages.
Mlot, "NBC News Acquires Stringwire for User-Generated Content", retrieved from http://www.pcmag.com/article2/0,2817,2422959,00.asp on Oct. 24, 2014, 2 pages.
Mobile Apps Policy, NBC Universal, retrieved from http://www.nbcuni.com/privacy/mobile-apps/ on Oct. 24, 2014, 3 pages.
Paul, "NBC News Buys Stringwire Smartphone Streaming-Video Service", retrieved from http://www.techhive.com/article/2046444/nbc-news-buys-stringwire-smartphone-streaming-video-service.html on Oct. 24, 2014, 5 pages.
Stelter, "NBC Buying Web Service to Stream Phone Video", New York Times, Aug. 11, 2013, retrieved from http://www.nytimes.com/2013/08/12/business/media/nbc-buying-web-service-to-stream-phone-video.html?_r=0&pagewanted on Oct. 24, 2014, 3 pages.
Stringwire on the App Store on iTunes by NBC News Digital, LLC, retrieved from https://itunes.apple.com/us/app/stringwire/id903661860?mt=8 on Oct. 24, 2015, 4 pages.
Stringwire Privacy Policy Go To Terms of Service, retrieved from https://stringwire.com/privacy on Oct. 24, 2015, 2 pages.
Stringwire Terms of Service Go To Privacy Policy, retrieved from https://stringwire.com/tos on Oct. 24, 2014, 22 pages.
International Search Report and Written Opinion for PCT/US15/60161 dated Feb. 1, 2016.

* cited by examiner

300

| Videographer ID (302) | Location (304) | Radius of Interest (600) | Operating Hours (700) |
|---|---|---|---|
| Vg1 | Lat/long X | 5 miles | Anytime |
| Vg2 | Lat/long Y | 20 miles | M-F; 8am-7pm |
| Vg3 | Lat/long Z | 50 miles | Wedn – Sunday; 7am– 5pm |
| ⋮ | ⋮ | ⋮ | ⋮ |
| VgN | Lat/long N | 10 miles | Tuesday: 8am-8pm<br>Wedn: 9am-1pm<br>Sat-Sun: Anytime |

Figure 7A

702: Determine time and location for footage request

704: Identify videographers whose operating hours are within the determined time for the footage request 706: For the identified time-available videographers, compute geographic zones around current location of each videographer based on each videographer's radius of interest 708: Identify all time-available videographers whose computed geographic zone encompasses the determined location for the footage request

| Footage Request ID (352) | Description (354) | Location (356) | ... | Time (710) |
|---|---|---|---|---|
| Fr123 | Please capture video of protests downtown at 1st Ave and Broadway | 100 Broadway, Anytown, USA 54321 | ... | Within next 1 hour |

Figure 7C

| Video ID (1002) | Videographer ID (1004) | Video Buyer ID (1006) | Footage Request ID (1008) | Video File (Streaming) (1010) | Video File (HD) (1012) | Location (1014) | Time (1016) | Description (1018) | Purchase Price (1020) | Purchase Flag (Y/N) (1022) |
|---|---|---|---|---|---|---|---|---|---|---|
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

LOCATION-BASED METHOD AND SYSTEM FOR REQUESTING AND OBTAINING IMAGES

CROSS-REFERENCE AND PRIORITY CLAIM TO RELATED PATENT APPLICATION

This patent application claims priority to U.S. patent application Ser. No. 62/078,863, filed Nov. 12, 2014, and entitled "Location-Based Method and System for Requesting and Obtaining Video Footage", the entire disclosure of which is incorporated herein by reference.

INTRODUCTION

The inventors believe there is need in the art for technology that is capable of satisfying the needs for consumers of image data such as video who desire access to images in a more timely and efficient manner than is currently available. For example, many media outlets such as television news organizations are desirous of attaining a wide variety of video of news events but are faced with the dilemma of satisfying such demand with a pool of on-staff human capital that is dwindling. As another example, television or movie producers may desire a specific shot of a distant location, but cannot justify the cost or time required to send one of their photographers to go and shoot such a location. As yet another example, advertisers may want access to a variety of images (such as images for an ad campaign which show people interacting with the advertised products), but lack a way of easily obtain such images.

To solve this problem, the inventors disclose a practical application of technology where the global positioning system (GPS) satellites in orbit around the earth are leveraged to find camera-equipped people who are physically located near locations from which images are desired. In accordance with an example embodiment, the inventors disclose a computer system where a server maintains a database that tracks current locations for a number of image providers based on where a plurality of GPS-enabled mobile computing devices carried by such image providers are located. The server can receive image requests from image requesters, where these image requests include a location where the requested image is to be captured. The server can then determine which of the image providers are to be automatically notified of an image request based on a geographical relationship between the location for the image request and the current locations of the image providers as reflected in the database. As an example of a geographical relationship, the server may require that the image location be within a specified distance of the current location for the videographer in order to notify that videographer of the image request. Thus, the server can act as an interface portal that automatically links image requests tied to locations with nearby people who are capable of fulfilling the image requests. In a preferred embodiment, the image data sought by image requesters from image providers is video of a news event.

Moreover, in additional example embodiments, the GPS locations for the mobile computing devices can be used in combination with various data structures processed by the computer system to select which image providers will receive notifications about image requests in a granularly intelligent manner. According to a first example, each image provider can be associated in a database with a geographic criterion indicative of a travel distance or travel time that reflects how far and/or how long each image provider is willing to travel to fulfill an image request. The computer system can then use the geographic criteria associated with the image providers when deciding which image providers will be notified of an image request (e.g., comparing a distance between an image provider's current GPS location and a location for an image request with a travel distance limitation associated with that image provider to decide whether that image provider is to be notified about the image request). According to a second example, each image request can include a field that defines a value for a geographic criterion indicative of a travel distance or travel time. The computer system can then use the geographic criteria associated with the image requests when deciding which image providers will be notified of an image request. By defining such geographic criteria on a per-image request location, image requesters can take into consideration the nature of each image request when deciding how wide of a net to cast for potential image providers. According to a third example, each image requester can be associated in a database with a geographic criterion indicative of a travel distance or travel time that reflects how wide of a net to cast around the image requests of each image requester. The computer system can then use the geographic criterion associated with a given image requester when deciding which image providers will be notified of an image request from that image requester.

These and other features and advantages of the present invention will be apparent to those having ordinary skill in the art upon review of the teachings in the following description and drawings.

BRIEF DESCRIPTION OF THE DRAWINGS

FIG. 7A depicts another example data structure for defining videographer profile data in a database according to another example embodiment.

FIG. 7B depicts another example process flow for execution by a server to determine which videographers will be automatically notified of a footage request from a video buyer according to another example embodiment.

FIG. 7C depicts yet another example data structure for a footage request from a video buyer in accordance with yet another example embodiment.

DETAILED DESCRIPTION

Figure 1:
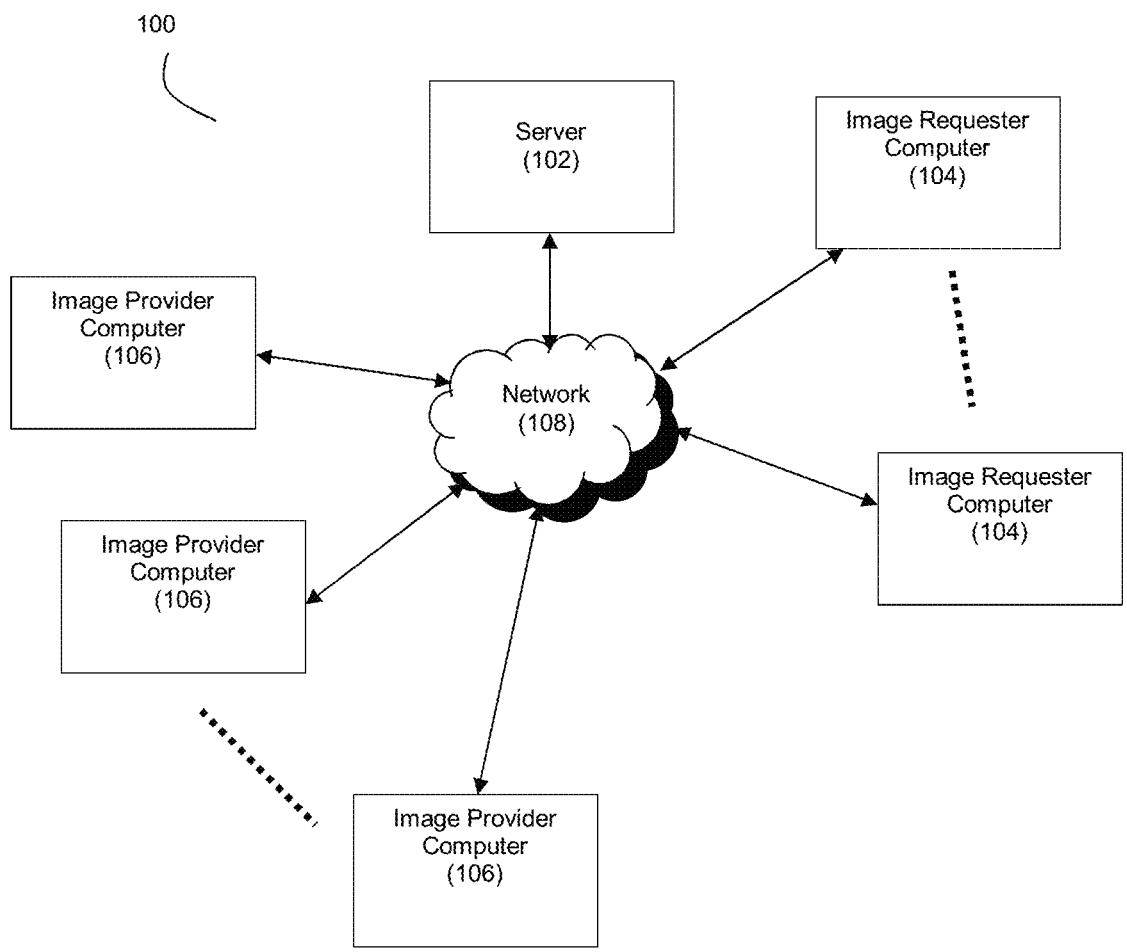
FIG. 1 depicts an example system in accordance with an example embodiment.

FIG. 1 depicts an example system 100 in accordance with an example embodiment. The system 100 includes a server 102, a plurality of image requester computers 104, and a plurality of image provider computers 106. The server 102 is capable of communicating with the image requester computers 104 and the image provider computers 106 via a communications network 108.

An image requester is any person or entity that desires to acquire an image as described herein. Examples of image requesters may include media outlets such as news organizations (e.g., TV news, online news, newspapers, etc). However, it should be understood that the image requester need not be limited to a media outlet. For example, as indicated above, television producers, movie products, and/or advertising agencies may also serve as image requesters. In another example embodiment, the image requester can be a real estate purchaser or developer with an interest in a remote real estate property who desires to see images of that remote real estate property before investing the time and money required to travel to the remote real estate property for review in person. The images may be still photographs or video. For purposes of description by way of example herein, subsequent descriptions of the images sought by the image requester will be made with respect to video. However, it should be understood that these example embodiments are also applicable to instances where the images sought are still photographs rather than video. Furthermore, for purposes of describing example embodiments herein, the term "video buyer" will be used synonymously with image requester. It should be understood that a video buyer as used herein need not make an actual purchase of a video to qualify as a video buyer.

An image provider is any person or entity that provides an image to the server 102 as described herein. Examples of image providers may include photographers or videographers, who are commonly referred to as "stringers" within the media industry. Once again, for purposes of explanation, subsequent discussions herein will focus on examples where the images sought are video but it should be understood that these example embodiments are also applicable to instances where the images sought are still photographs rather than video. Moreover, it should be understood that the image or video provider need not be limited to a stringer for a media outlet. Furthermore, for purposes of describing example embodiments herein, the term "videographer" will be used synonymously with image provider. It should be understood that a videographer as used herein need not necessarily be the actual person who shot the video in question.

The communications network 108 may be any network capable of communicating information between computers, including but not limited to wired and wireless networks, the Internet, cellular networks, and any combinations thereof.

The server 102 can be a server computer system that includes one or more processors and one or more memories that are capable of performing the operations described herein. In an example embodiment, the server 102 is operated by a third party entity relative to the image requesters and image providers. In such an example, the third party's server 102 is a platform through which image requesters can gain access to a pool of image providers (and vice versa). However, it should be understood that the server 102 need not necessarily be operated by a third party. For example, the server 102 could also be operated by an image requester, or even an image provider.

The image requester computers 104 can be computer systems operated by image requesters that include one or more processors and memories that are capable of performing the operations described herein.

The image provider computers 106 can be computer systems operated by image providers that include one or more processors and memories that are capable of performing the operations described herein. In an example embodiment, many of the image provider computers 106 can be GPS-enabled mobile computing devices such as smart phones or tablet computers. Preferably, the GPS-enabled mobile computing devices that serve as image provider computers 106 also include touchscreen user interface displays. However, it should be understood that some image providers may choose to employ desktop computers or the like for at least a portion of their interactions with the server 102 (for example, to upload image files to the server 102).

Figure 2:
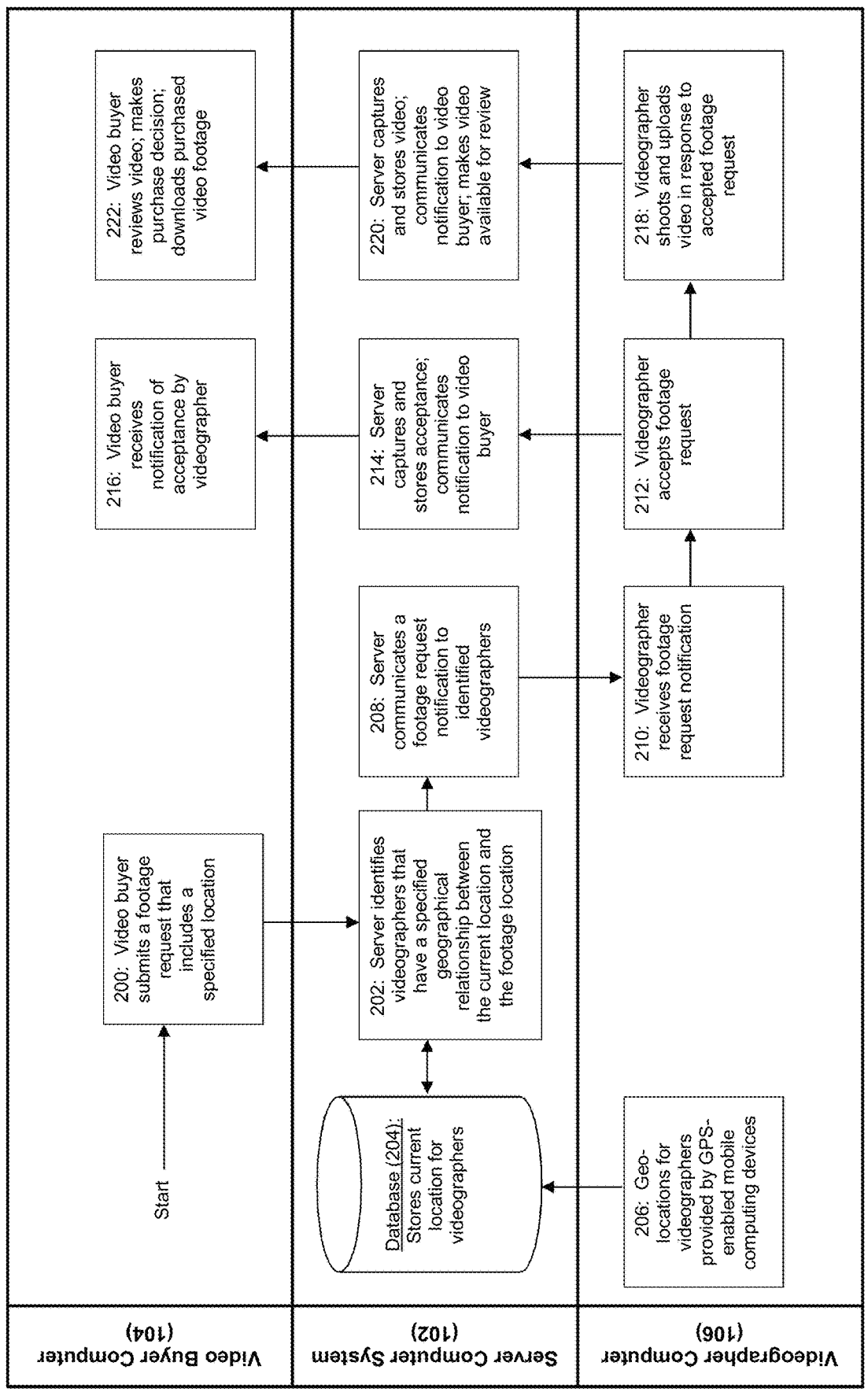
FIG. 2 depicts an example process flow for execution by the system of FIG. 1.

In operation, users of the image requester computers 104 may desire to use server 102 as a portal to access a large pool of image providers who may be interested in satisfying the needs of image requesters for image data. FIG. 2 depicts an example process flow for execution by the system of FIG. 1 in this regard. Through the example process flow of FIG. 2, the server computer system 102 serves as an interface between a video buyer computer 104 and a videographer computer 106.

The process flow of FIG. 2 starts at step 200 where a video buyer computer submits a video footage request to the server computer system 102. As explained below, the video buyer computer can execute a software application that provides a user interface (UI) screen through which a user of the video buyer computer can formulate and submit the video footage request. The video footage request includes a specified location indicative of where the video footage should be shot as well as a description of the desired content of the video footage. This video footage request is communicated from the video buyer computer 104 to the server computer system 102 via network 108.

At step 202, the server computer system 102 interacts with a database 204 to determine which of a plurality of videographers are to receive the footage request from the video buyer. To support step 202, the database 204 is configured to store a plurality of current locations in association with a plurality of videographers. To provide the database 204 with this information, GPS-enabled mobile computing devices that are carried by the videographers can wirelessly send messages via network 108 for receipt by the server computer system 102, where the messages include the current GPS locations attributable to the videographers (step 206). It should be understood that the database 204 will be updated on a repeating basis (e.g., every 10 minutes or the like) such that the current location data stored in the database 204 for each videographer can serve as a good indicator of where the videographer is actually located at a given time.

At step 202, the server identifies a subset of the videographers in the database 204 that have a specified geographical relationship between the current location of each videographer (as reflected by the database 204) and the footage location from the video footage request. For example, the specified geographical relationship can be a requirement that the current location for the videographer and the footage location be within some specified distance of each other (e.g., within 5 miles or the like). However, it should be understood that this geographical relationship need not be based on specified distances but can also factor in other considerations such as time considerations that are tied to the geographic area between the current location of the videographer and the footage location. For example, the server computer system 102 can be configured to access a source of traffic data (e.g., traffic information available from Google Maps or other road navigation tools) to determine an estimated travel time for a given route between the current location for the videographer and the footage location. If this travel time is within a specified time threshold, then a videographer may be identified to receive a footage request.

It should be understood that the subset of videographers identified at step 202 may include only a single videographer. If no videographers are identified at step 202, then the server computer system 102 can notify the video buyer computer 104 of the inability to locate nearby videographers.

At step 208, the server computer system 102 communicates a footage request to the identified subset of videographers by sending the footage request over network 108 to the videographer computers 106 associated with that subset of videographers. This footage request may also include data that identifies the location corresponding to the sought video footage and a description of the sought video footage.

At step 210, the videographer receives a notification of the footage request sent to him or her via a UI (e.g., a UI screen, an audio UI, etc.) of his or her videographer computer 106. This notification may include an identification of the footage location and a description of the sought video. The videographer can then choose whether to accept this assignment or not. The system can be configured to support exclusive and non-exclusive assignments of footage requests. With a non-exclusive footage request, any of a number of videographers may accept and attempt to fulfill the footage request through the system. With an exclusive footage request, the acceptance of a footage request by a single videographer would create an exclusive relationship between the video buyer and the accepting videographer for that assignment such that the system would not permit other videographers to also accept the footage request.

At step 212, the videographer accepts the footage request by entering an input via the UI screen of his or her videographer computer 106. This acceptance input is communicated to server 102 via network 108. At step 214, the server 102 captures the acceptance by the videographer and stores the acceptance as a record in a database. This acceptance is also communicated by server 214 to the video buyer computer 104 to notify the video buyer that a videographer will be attempting to capture video in response to the video footage request. Thus, at step 216, the video buyer computer can notify the video buyer of this acceptance via a UI screen of the video buyer computer 104.

At step 218, the videographer shoots the sought video footage to create a video file that is responsive to the video footage request. The videographer computer 106 can then upload this video file to the server 102 via network 108. It should be understood that the video file can be in any format acceptable by the server 102 or video buyer computer 104 (e.g., MP4 format, MOV format, or any other suitable format).

At step 220, the server 102 captures the uploaded video file and stores the video file in a database. The server 102 can also communicate a notification to the video buyer computer 104 that a video responsive to its footage request is available for review. The server 102 is configured to provide the video buyer computer with access to the video. At step 222, the video buyer computer reviews the video file via a UI screen of the video buyer computer. Based on this review, the video buyer can decide whether to purchase the video. If the video buyer decide to purchase the video, the video buyer computer can communicate a purchase request to the server 102 via network 108. In response to this purchase request, the video buyer computer can download the purchased video from the server 102.

Thus, FIG. 2 illustrates how the server 102 can be used as a portal for bringing together video buyers with videographers a new and technologically innovative way based on the tracked geographic locations of videographers. Footage requests from video buyers can be communicated in real-time and a targeted manner to videographers who are proximate to the locations where the video footage is desired to greatly streamline and economize how video buyers can gain access to video of interest.

Figure 3A:
FIG. 3A depicts an example data structure for tracking the current locations of videographers in a database for an example embodiment.

FIG. 3A depicts an example of data structure 300 that can be used as database 204 by server 102. The data structure 300 can include a plurality of data elements that associate an identifier for a videographer 302 with location data 304. A given item of location data 304 can serve to represent the current location for the videographer identified by the identifier 302 associated with that item of location data 304. As an example, the current location data can be a geographic coordinate such as a latitude and longitude position. Thus, if the server 102 wanted to determine the current location for videographer Vg2, the server 102 can access data structure 300 to look up latitude/longitude coordinate Y, which serves as the current location for videographer Vg2. It should be understood that a data structure such as data structure 300 may be a physical manifestation of information organized within a computing system. Examples of data structures may include data files, records, tables, arrays, trees, objects, and the like.

Figure 3B:
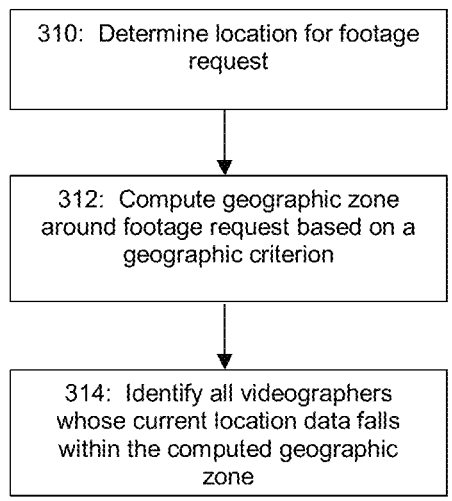
FIG. 3B depicts an example process flow for execution by a server to determine which videographers are to receive a footage request from a video buyer according to an example embodiment.
Figure 3C:
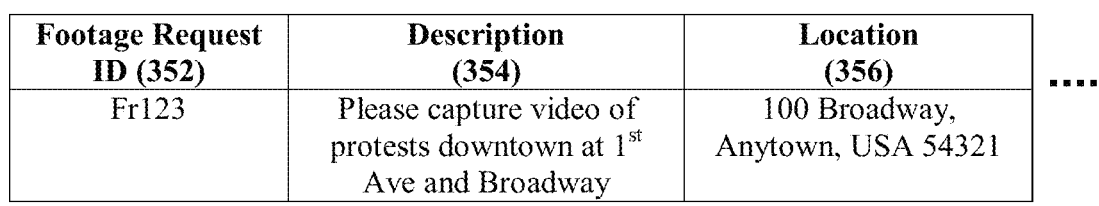
FIG. 3C depicts an example data structure for a footage request from a video buyer in accordance with an example embodiment.
Figure 5:
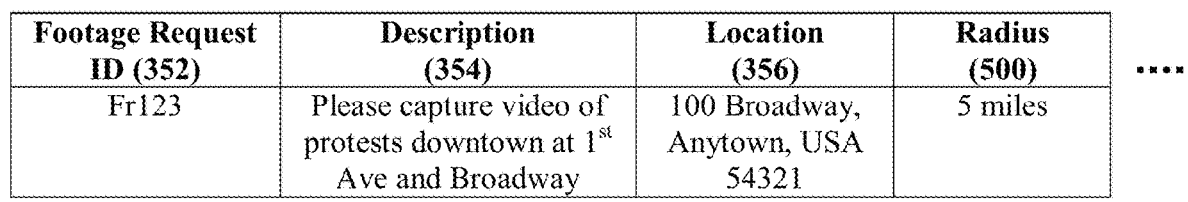
FIG. 5 depicts another example data structure for a footage request from a video buyer in accordance with another example embodiment.

FIG. 3B depicts an example process flow for execution by the server 102 to perform step 202 of FIG. 2. At step 310, the server 102 determines the specified location for the footage request. As noted, the footage request will include data indicative of the location where the video footage is needed, and step 310 can operate to extract this data from the footage request. FIG. 3C depicts an example data structure 350 for a footage request from a video buyer. The footage request 350 may include a field 352 that serves as a footage request identifier, a field 354 that serves as a description of the sought video footage, and a field 356 that identifies the location for the sought video footage. The location field 356 may be expressed in any of a number of data formats, including but not limited to an address and/or a latitude/longitude coordinate. It should also be understood that GIS services are available that can readily translate an address into a latitude/longitude coordinate. This translation can be performed by the video buyer computer or the server. It should further be understood that the footage request 350 may include more, fewer, different, and/or differently ordered fields than those shown by FIG. 3C. For example, the footage request 350 may also include an identifier for the video buyer that generated the footage request. FIGS. 5 and 7C depict additional examples of footage request formats that may be used in example embodiments.

At step 312, the server 102 computes a geographic zone around the determined footage request location based on a geographic criterion. For example, the server 102 may be configured to create the geographic zone as the area encompassed by a 5 mile radius around the footage location. In an example where the determined footage request location is represented by a latitude/longitude coordinate, and the geographic zone of interest is a 5 mile radius, GIS techniques can be used to identify pertinent constraints that define the 5 mile radius around the footage request location's latitude/longitude coordinate. However, it should be understood that other geo-zoning techniques could be used. For example, as noted above, the geo-zoning can factor estimated travel times into the computed geographic zone.

At step 314, the server 102 interacts with data structure 300 to identify all videographers whose current location data falls within the computed geographic zone. Continuing with the example from above where a 5 mile radius around the footage request location is used, and where the videographer locations are represented by latitude/longitude coordinates, the data structure 300 can be analyzed to identify all videographers whose latitude/longitude coordinates fall within the geographic zone defined by the 5 mile radius around the latitude/longitude coordinate of the footage request location. However, once again, other techniques can be used to identify videographers whose tracked current locations fall within the geographic constraints of the system.

Figure 4:
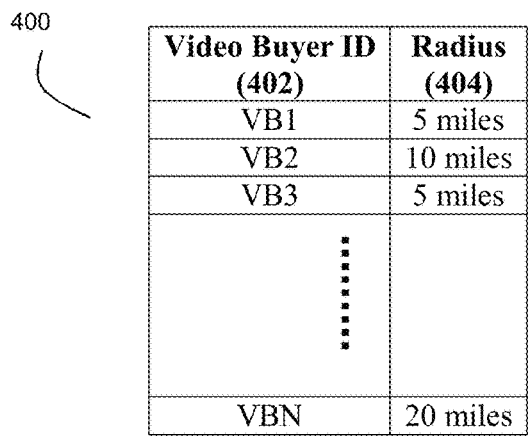
FIG. 4 depicts an example data structure that defines, on a per-video buyer basis, a value for a radius around a footage request for use when identifying videographers who are to receive footage requests from the server according to an example embodiment.

It should be understood that the geographic criterion used at step 312 need not be a fixed distance value for all footage requests. For example, the geographic criterion can be a video buyer-specific value. FIG. 4 depicts an example data structure 400 that includes a plurality of data elements that associate an identifier for a video buyer 402 with distance data 404 (e.g., a radius value). Thus, when performing step 312 using data structure 400, the server 402 can determine the video buyer associated with the video footage request and perform a lookup in data structure 400 to identify the radius value 404 associated therewith. This radius value can then serve as the radius for the geographic zone computed at step 312. Accordingly, the size of the geographic zones computed at step 312 for different footage requests may vary based on which video buyer submitted each footage request.

As another example, the geographic criterion can be a footage request-specific value. FIG. 5 depicts an example data structure 350 for a footage request that includes a field 500 that specifies a radius around the footage location to be used when computing the geographic zone at step 312. By specifying the geographic criterion on a footage request-specific basis, a video buyer can tailor a footage request to correspond to any special considerations for the sought video. For example, if the footage request has a footage location located in a densely populated area, a smaller distance value could be used in field 500 (e.g., 5 miles) under the expectation that there is likely to be at least one videographer within such a small radius of the footage location. However, if the footage request has a footage location in a sparsely populated area, a larger distance value could be used in field 500 (e.g., 20 miles or more) under the expectation that a larger zone may be needed to find a videographer interested in capturing the sought video.

Figure 6A:
FIG. 6A depicts an example data structure for defining videographer profile data in a database according to an example embodiment.
Figure 6B:
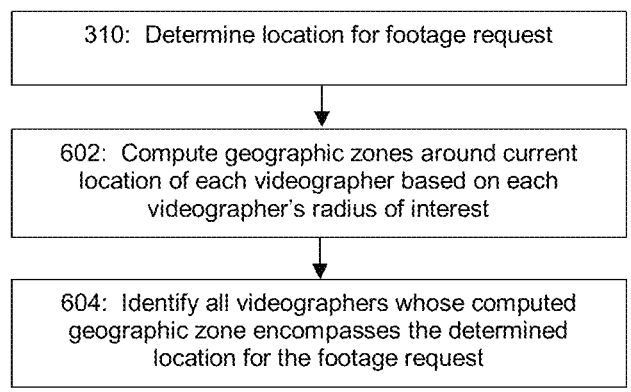
FIG. 6B depicts an example process flow for execution by a server to determine which videographers will be automatically notified of a footage request from a video buyer according to an example embodiment.

FIGS. 6A and 6B describe another example for how step 202 of FIG. 2 can be performed. In the examples of FIGS. 6A and 6B, the geographic relationship is governed by data within a user profile for a videographer that indicates how far each videographer is willing to travel to capture video. In FIG. 6A, the data structure 300 also includes data elements 600 that are associated with each videographer to define how far each videographer is willing to travel (e.g., a radius of interest). Thus, as shown by FIG. 6B, after the server performs step 310 to determine the footage location, the server can compute geographic zones around the current locations of each videographer based on each videographer's associated radius of interest. Thus, videographer Vg1 will have a geographic zone defined by a 5 mile radius around his or her current location while videographer Vg2 will have a geographic zone defined by a 20 mile radius around his or her current location, and so on. At step 604, the server identifies the videographers whose computed geographic zones encompass the footage location determined at step 310.

It should be understood that the geographic criteria expressed via field 404 of FIG. 4, field 500 of FIG. 5, and field 600 of FIG. 6 need not be expressed as distance values. For example, the geographic criteria can also be expressed as time values. As noted above, the server 102 can use a GIS system to convert a distance between the current location for a videographer and the footage location into a travel time based on estimated traffic conditions between those two locations. This travel time can then be compared against time values in fields 404, 500, or 600 when determining which videographers are to receive footage requests.

FIGS. 7A-7C describe another example for how step 202 of FIG. 2 can be performed. This example takes into consideration operating hours for the videographers. User profiles for the videographers can include data indicative of when each videographer is willing to accept work. In FIG. 7A, the data structure 300 also includes data elements 700 that are associated with each videographer to define each videographer's operating hours. Thus, as shown by FIG. 7B, the server at step 702 not only determines a location for a received footage request (as described in connection with step 310) but also determines a time for each footage request that is indicative of when the footage request is needed. FIG.

7C depicts an example footage request 350 that includes a field 710 that expresses such a time value. It should be understood that this time value includes at least a date and may also include a time of day (such as a 9:00 pm, Nov. 20, 2014). At step 704, the server 102 interacts with data structure 300 to filter the available videographers based on their associated operating hours relative to the determined time for the footage request. Step 706 then operates like step 602 (or step 312) but with respect to the time-available videographers that were found as a result of step 704. Thereafter, at step 708, the server identifies the time-available videographers who are geographically relevant to the footage request as per step 604 (or step 314).

It should be understood that other techniques for filtering videographers by operating hours could also be used. For example, steps 704 and 706 can be effectively performed in reverse order, where the software first identifies geographically-relevant videographers and then filters those geographically-relevant videographers by their operating hours.

Further still, the server can also take into consideration other factors when identifying geographically-relevant videographers for a footage request. For example, the system can take into consideration factors such as an estimated propensity of a videographer to accept a footage request, and/or an estimated suitability of a videographer for satisfactorily fulfilling a footage request.

To support such decision-making, the system can track historical activities of the videographers with respect to footage requests to build a database 754 (see FIG. 7D, for example) that tracks how videographers have in the past accepted footage requests as a function of distance from their then current locations, as a function of time of day and/or day of the week, as a function of the type of footage request (e.g., footage requests relating to crime, weather, sports. etc.), and the like. These historical data records can then serve as indicators for assessing a propensity of a videographer to accept a given footage request. In another example embodiment, these historical data records can also be used to set payment levels for each videographer.

Such a database 754 may also be used to track how well the footage submitted by the videographers have sold in the past or otherwise been received or regarded by evaluators (e.g., Videographer Y has sold 85% of his or her videos in the past, or more granularly, Videographer Y has sold 90% of his or her weather videos, 80% of his or her sports videos, etc.). Similarly, the database 754 could also be configured to assign grades to the quality of videos submitted by each videographer, and these grades could be aggregated to form an overall grade for the videographers that is indicative of their skill with regard to gathering footage. Historical data of this type can serve as indicators regarding a suitability of a videographer for fulfilling a given footage request.

Figure 7D:
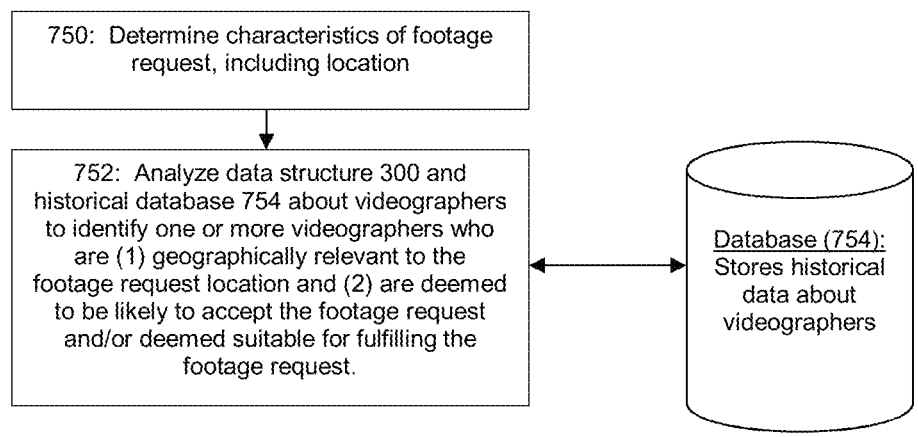
FIG. 7D depicts another example process flow for execution by a server to determine which videographers will be automatically notified of a footage request from a video buyer according to another example embodiment.

Thus, as shown by FIG. 7D, the server can extract pertinent characteristics from a footage request (step 750). For example, in addition to determining the location for a footage request, the server at step 750 can identify a time of day or day of week for the request, a type for the footage request (e.g., crime, weather, sports. etc.), and the like. At step 752, the server can then analyze the data structure 300 and the historical database 754 to identify one or more videographers to whom a footage request will be communicated. For example, at step 752, if a large number of videographers are identified as being geographically relevant to the footage request based on data structure 300, then the historical database 754 can be analyzed to filter these geographically-relevant videographers to a subset of the videographers who are most likely to accept the footage request given past actions and/or most suitable for satisfactorily fulfilling the footage request given past performance. With such filtering, a number of advantages can be achieved. For example, the system can avoid discouraging videographers who might otherwise not participate because they would be competing against too large of a pool of other videographers. Also, the system can reduce the risk that a video requester will be flooded with large volumes of acceptances and/or low quality footage.

Figure 8A:
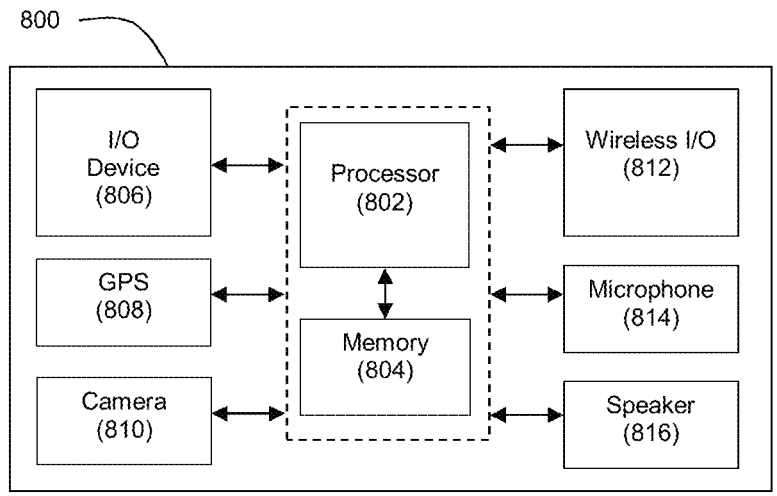
FIG. 8A depicts an example of a mobile computing device that can be used by a videographer.

FIG. 8A depicts an example of a GPS-enabled mobile computing device 800 that can be used by a videographer as the videographer computer 106 in accordance with example embodiments described herein. The GPS-enabled mobile computing device 800 includes a processor 802 and associated memory 804, where the processor 802 and memory 804 are configured to cooperate to execute software and/or firmware that supports operation of the mobile device 800. Furthermore, the mobile device 800 may also include an I/O device 806 (e.g., a touchscreen user interface for graphically displaying output data and receiving input data from a user), a GPS component 808, a camera 810 capable of capturing video, wireless I/O 812 for sending and receiving data, a microphone 814 for capturing sound, and a speaker 816 for converting sound data into audible sound. The wireless I/O 812 may include capabilities for sending and receiving messages over network 108 as well as making and taking telephone calls. The wireless I/O may also be capable of communicating with nearby objects via near field communication (NFC), communicating with nearby objects via RF, and/or communicating with nearby objects via BlueTooth.

Figure 8B:
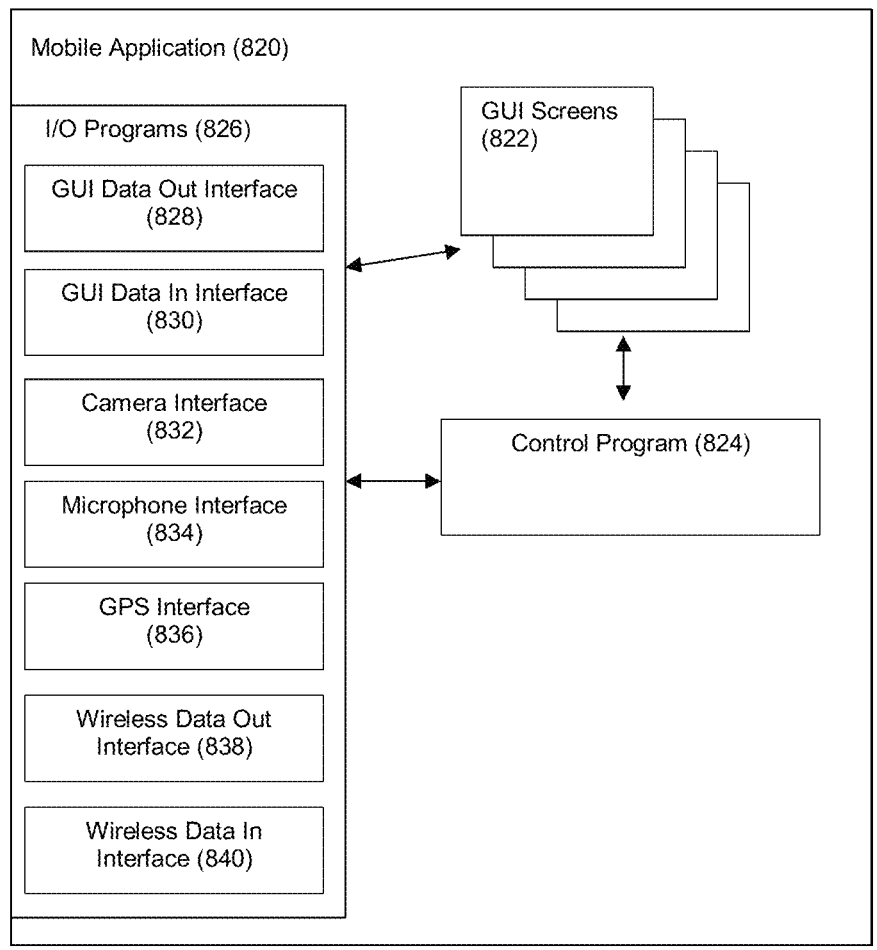
FIG. 8B depicts an example mobile application for execution by a videographer's mobile computing device in accordance with an example embodiment.

A mobile application 820 (or "app") executed by the mobile device 800 can operate as the medium through which videographers interact with server 102. FIG. 8B depicts an exemplary mobile application 820 for execution by the processor 802 of the GPS-enabled mobile computing device 800 of FIG. 8A. The mobile application 820 preferably comprises a plurality of computer-executable instructions resident on a non-transitory computer-readable storage medium such as a computer memory. The mobile application 820 can be downloaded from memory in a remote site such as an "app store" or the like to a videographer's GPS-enabled mobile computing device 800 for storage in memory 804. The instructions may include instructions defining a plurality of graphic user interface (GUI) screens for presentation to the videographer through the I/O device 806. The instructions may also include instructions defining various I/O programs 826 such as:
- a GUI data out interface 828 for interfacing with the I/O device 806 to present one or more GUI screens 822 to the user;
- a GUI data in interface 830 for interfacing with the I/O device 806 to receive user input data therefrom;
- a camera interface 832 for interfacing with a camera 810 for capturing video shot by the videographer using the camera 810;
- a microphone interface 834 for interfacing with a microphone 814 for capturing the sound aspects of a video shot by the videographer using the camera 810;
- a GPS interface 836 for interfacing with the GPS component 808 to receive the current GPS position attributable to the videographer;
- a wireless data out interface 838 for interfacing with the wireless I/O 812 to provide the wireless I/O with data for communication over the network 108; and
- a wireless data in interface 840 for interfacing with the wireless I/O 812 to receive data communicated over the network 108 to the mobile device 800 for processing by the mobile application 820.

The instructions may further include instructions defining a control program 824. The control program can be configured to provide the primary intelligence for the mobile application 820, including orchestrating the data outgoing to and incoming from the I/O programs 826 (e.g., determining which GUI screens 822 are to be presented to the user). Among the primary tasks of control program 824 are to obtain a current GPS location for the device 800 on a repeating basis, communicating such GPS position data to the server 102, and capturing/tagging/uploading video in response to footage requests. Examples of GUI screens that may be employed by mobile application 820 are discussed below.

Figure 8C:
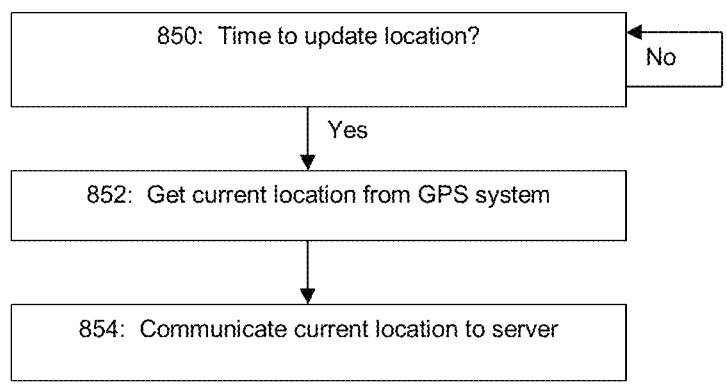
FIGS. 8C and 8D depict examples of process flows for execution by the mobile application of FIG. 8B to notify the server of a current location for a videographer.
Figure 8D:
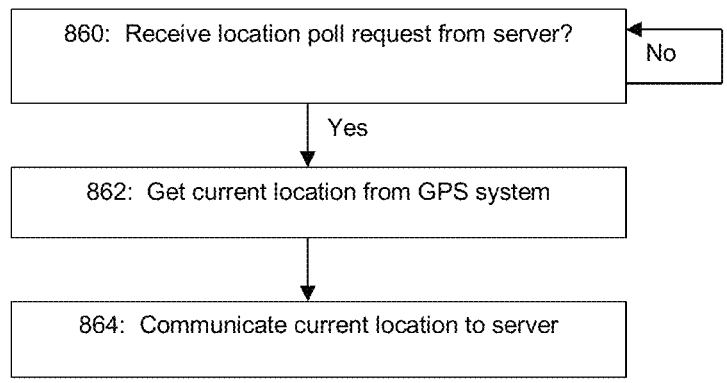

FIGS. 8C and 8D depict examples of process flows for execution by the mobile application 820 to track the current location of a videographer. FIG. 8C depicts an example where the mobile application 820 pushes its GPS position to the server 102 on a periodic basis, while FIG. 8D depicts an example where the server 102 polls the mobile application 820 on a periodic basis for its GPS position.

With respect to FIG. 8C, at step 850, the mobile application determines whether it is time to update the location for the device 800. This determination can be made on a repeating basis (such as every 10 minutes). This determination can also be triggered when the mobile application 820 is opened and/or when the mobile device 800 powers on. If step 850 results in a determination that it is time to update the current location for the device 800, then at step 852, mobile application interacts with the GPS component 808 of the device 800 to get the current GPS location of the mobile computing device 800. This interaction can be a request from the control program 824 routed to the GPS receiver 808 via GPS interface 836 (with a response flowing back to the control program 824 from the GPS receiver 808 via the GPS interface 836). At step 854, the mobile application 820 causes the mobile device 800 to wirelessly communicate the current GPS location of device 800 to the server 102. This can be accomplished by the control program sending a message via wireless data out interface 838 to the wireless I/O 812 for wireless transmission to the server 102.

With respect to FIG. 8D, at step 860, the mobile application determines whether a location poll request has been received by the mobile computing device 800 from server 102. The server 102 can be configured to poll the mobile computing devices on a repeating basis (e.g., sending each mobile computing device a location pool request every 10 minutes). If a location poll request has been received (via the wireless I/O 812 and wireless data in interface 840), then at step 862, the mobile application gets the current GPS position for the device 800. Step 862 can operate as described above for step 852. Thereafter, at step 864, the mobile application communicates this GPS location data to the server 102 as described in connection with step 854.

Figure 9A:
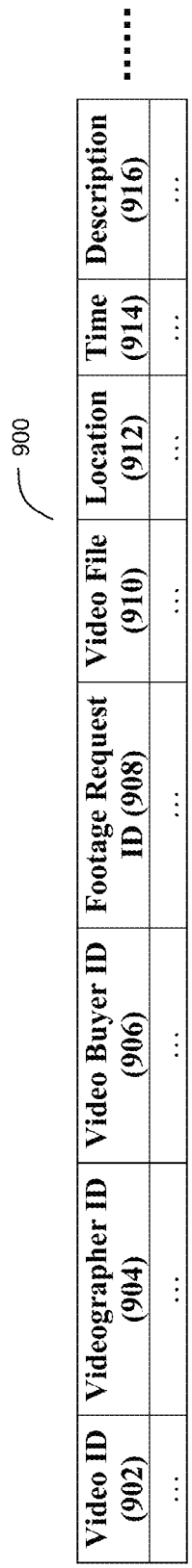
FIG. 9A depicts an example data structure for a video upload from a videographer according to an example embodiment.
Figure 9B:
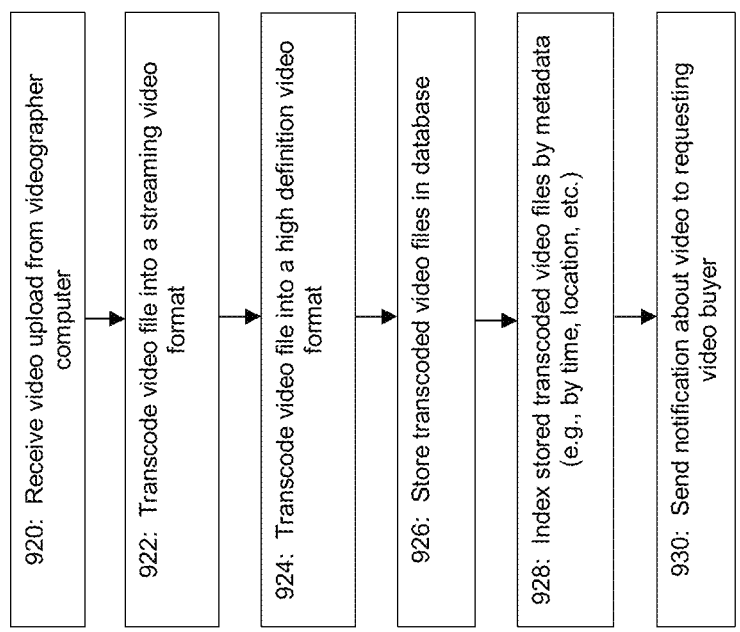
FIG. 9B depicts an example process flow for execution by a server to process video files uploaded from a videographer in accordance with an example embodiment.

FIGS. 9A and 9B describe examples of how video files that have been uploaded from a videographer computer 106 to the server 102 can be processed by the server 102 to render those video files accessible to video buyer computers 104. FIG. 9A depicts an example data structure 900 for a video upload from a videographer computer 106 according to an example embodiment. The video upload data structure 900 may include not only the video file 910 but also metadata about the video file 910. Examples of metadata include a field 902 that serves as an identifier for the video upload, a field 904 that serves as an identifier for the videographer who uploaded the video, a field 906 that serves as an identifier for the video buyer that requested the video, a field 908 that serves as an identifier for the footage request to which the video is responsive, a field 912 that serves as an identifier for the location where the video was shot, a field 914 that serves an identifier for the time when the video was shot, and a field 916 that serves a description of the content of the video (where this description may include one or more keywords that are descriptive of the video content). It should be understood that the video upload data structure 900 may include more, fewer, different, and/or differently ordered fields if desired by a practitioner.

According to FIG. 9B, at step 920, the server receives a video upload from a videographer computer 106. This video upload can take the form of the data structure 900 shown by FIG. 9A.

At step 922, the server automatically transcodes the video file 910 into a streaming video format (e.g., MP4, H.264, variable bit rate). This streaming video format can be a format that is optimized or suitable for streaming video over the Internet (e.g., for previewing a video). At step 924, the server automatically transcodes the video file 910 into a high definition video format (e.g., MP4, H.265, 720P). This HD format can be a format that is optimized or suitable for broadcast on television or the like. Thus, the server 102 can, upon receipt of a video file from a videographer computer, automatically create two versions of the video file for review and access by a video buyer computer.

At step 926, the server stores these transcoded video files in a database. These stored video files (the streaming version and HD version) are indexed by the metadata included in the video upload data structure 900 (step 928). This database can then serve as a useful and highly searchable source of videos to a video buyer computer. Next, at step 930, the server sends a notification about the uploaded video to the video buyer computer that submitted the footage request to which the uploaded video was responsive.

Figures 10A, 10B:
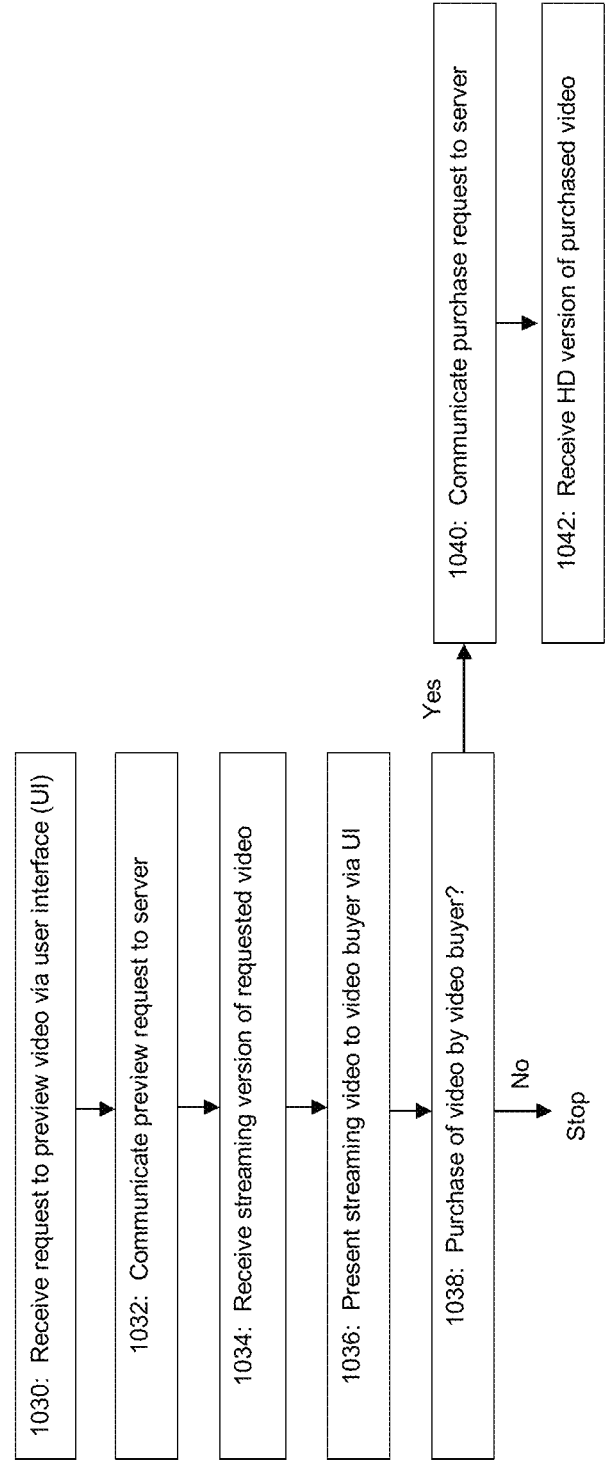
FIG. 10A depicts an example data structure for video files stored by the server in a database according to an example embodiment.
FIG. 10B depicts an example process flow for execution by a video buyer computer to review videos for possible purchase according to an example embodiment.

FIG. 10A depicts an example of a data structure 1000 that can serve as the database of videos created at step 928. The database records can include not only the streaming and HD versions of the videos (fields 1010 and 1012 respectively) but also the metadata about the videos. Examples of metadata include a field 1002 that serves as an identifier for the video, a field 1004 that serves as an identifier for the videographer who uploaded the video, a field 1006 that serves as an identifier for the video buyer that requested the video, a field 1008 that serves as an identifier for the footage request to which the video is responsive, a field 1014 that serves as an identifier for the location where the video was shot, a field 1016 that serves an identifier for the time when the video was shot, a field 1018 that serves a description of the content of the video (where this description may include one or more keywords that are descriptive of the video content), a field 1020 that identifies a purchase price for the video, and a field 1022 that serves as a flag to indicate whether the video has been purchased. It should be understood that the data structure 1000 may include more, fewer, different, and/or differently ordered fields if desired by a practitioner.

Through a UI screen presented on a video buyer computer 104, a video buyer can search for videos of interest based on any combination of the metadata used to index the video files by data structure 1000. Furthermore, videos that are specifically tied to a video buyer computer and/or footage request from a video buyer computer can be automatically identified, and UI screens on the video buyer computer can be automatically populated with notifications about these videos.

FIG. 10B depicts an example process flow for execution by a software application of a video buyer computer to review videos for possible purchase according to an example embodiment. At step 1030, the video buyer computer receives a request to preview a video in database 1000 via a UI screen. At step 1032, the video buyer computer communicates this request to the server 102. The server retrieves the streaming version of the request video from database 1000 and communicates at least a portion of the streaming video to the video buyer computer. The video buyer computer then receives the streaming video portion (step 1034) and presents the streaming video portion to the video buyer via a UI (step 1036).

The video buyer can then make a decision as to whether this video should be purchased (step 1038). If the video buyer wishes to purchase the video, the video buyer computer can communicate the purchase request to the server 102 at step 1040. The server 102 can then authorize the purchase request and communicate the HD version of the purchased video to the video buyer computer via network 108. At step 1042, the video buyer computer receives the HD version of the purchased video from the server to complete the transaction. The server can then update its database to reflect the purchase.

Any of a number of contractual relationships can be entered into among the operator of the server 102, a video buyer, and a videographer when operating the system described herein. For example, an agreement can be executed between an operator of the server 102 and a videographer that governs how the videographer will be compensated when videos are purchased by video buyers. For example, the videographer can be compensated based on some defined percentage of a sale price for a video to a video buyer. Another agreement can be executed between the operator of the server 102 and a video buyer that governs how the video buyer will pay for videos. For example, a video buyer might be provided with preview access to videos via server 102 for free but must pay the server operator for each video purchased. As another example, a video buyer might pay a subscription fee to the server operator to gain preview access to videos and also pay the server operator for each video purchased. As yet another example, a subscription fee paid by a video buyer to a server operator may provide the video buyer with a specified number of videos per time period (e.g., 10 videos per month or the like). Accounting software executed by server 102 can track and enforce the payment obligations among the various parties.

FIGS. 11-21 depict examples of UI screens that may be employed by the system during operation.

Figure 11:
FIGS. 11 and 12 depict examples of user interface (UI) screens for display on a video buyer computer according to an example embodiment.

FIG. 11 depicts an example UI screen for display on a video buyer computer that provides a video buyer with a home page or dashboard view of the system for a video buyer. The UI screen of FIG. 11 may include a section that lists a number of the video buyer's previous footage requests. This list can include indicators as to how many videographers have accepted each footage request and how many video uploads have occurred in response to each footage request. The items on this list can be selectable links to navigate the video buyer to UI screen specific to a subject footage request or video upload.

The UI screen of FIG. 11 may also include various views relating to videos sought by the video buyer. FIG. 11 depicts a grid view of requested videos where thumbnails of screenshots for a plurality of uploaded videos requested by the video buyer are shown in a grid layout. These videos can also be presented in a list format and a map format (where each video is pinpointed to a location on a map where it was shot).

The UI screen of FIG. 11 also includes selectable links for the video buyer to formulate new footage requests. Further still, the UI screen of FIG. 11 includes user entry fields for a user to perform keyword or other metadata searches (e.g., location searches and/or time/date searches) within database 1000 for videos of interest.

Figure 21:
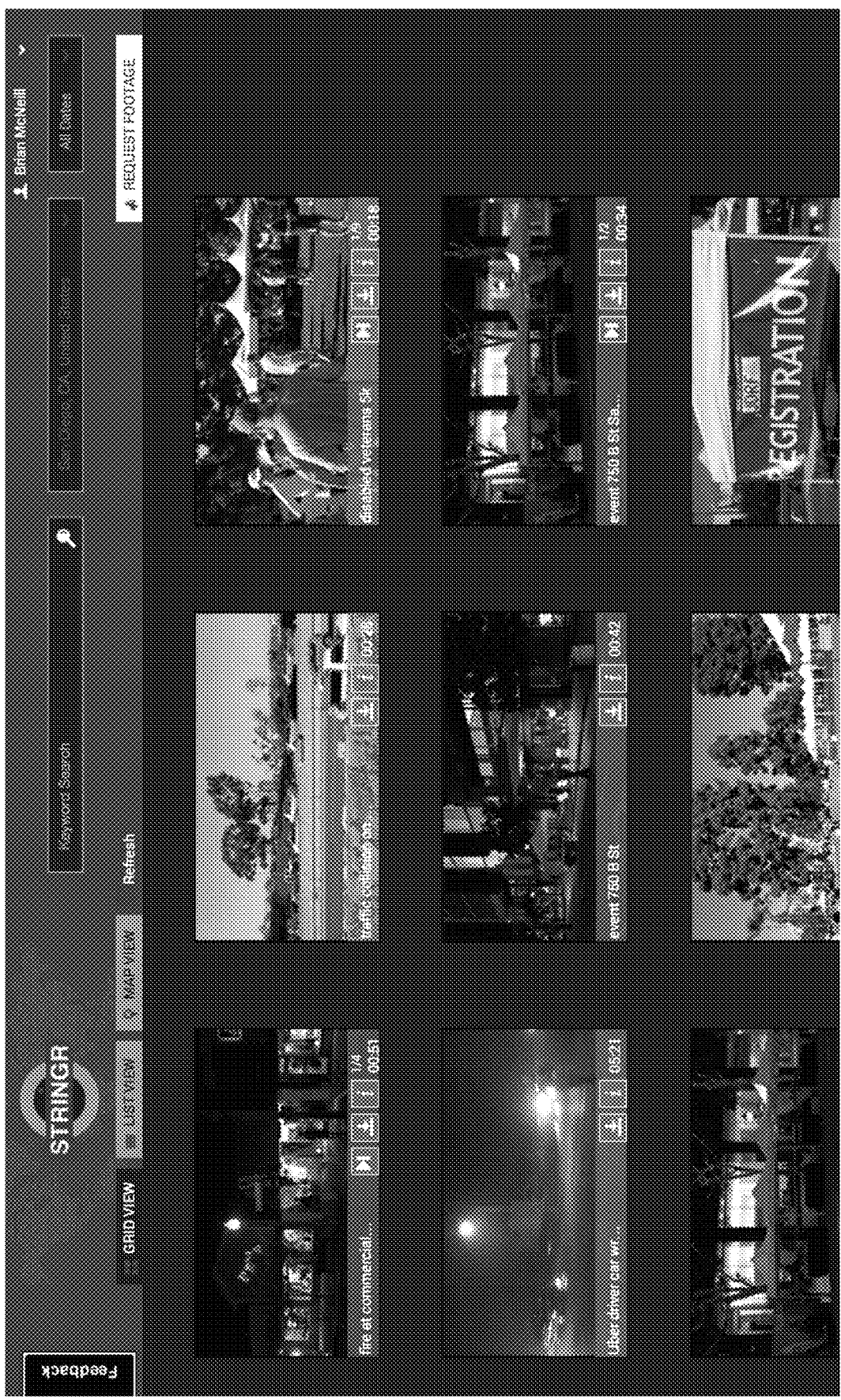
FIG. 21 depicts another example of a UI screen for display on a video buyer computer according to an example embodiment.

FIG. 21 depicts an example of a UI screen for a video buyer computer that is similar to FIG. 11 but omits the footage request summary section shown in the left portion of FIG. 11.

Figure 12:
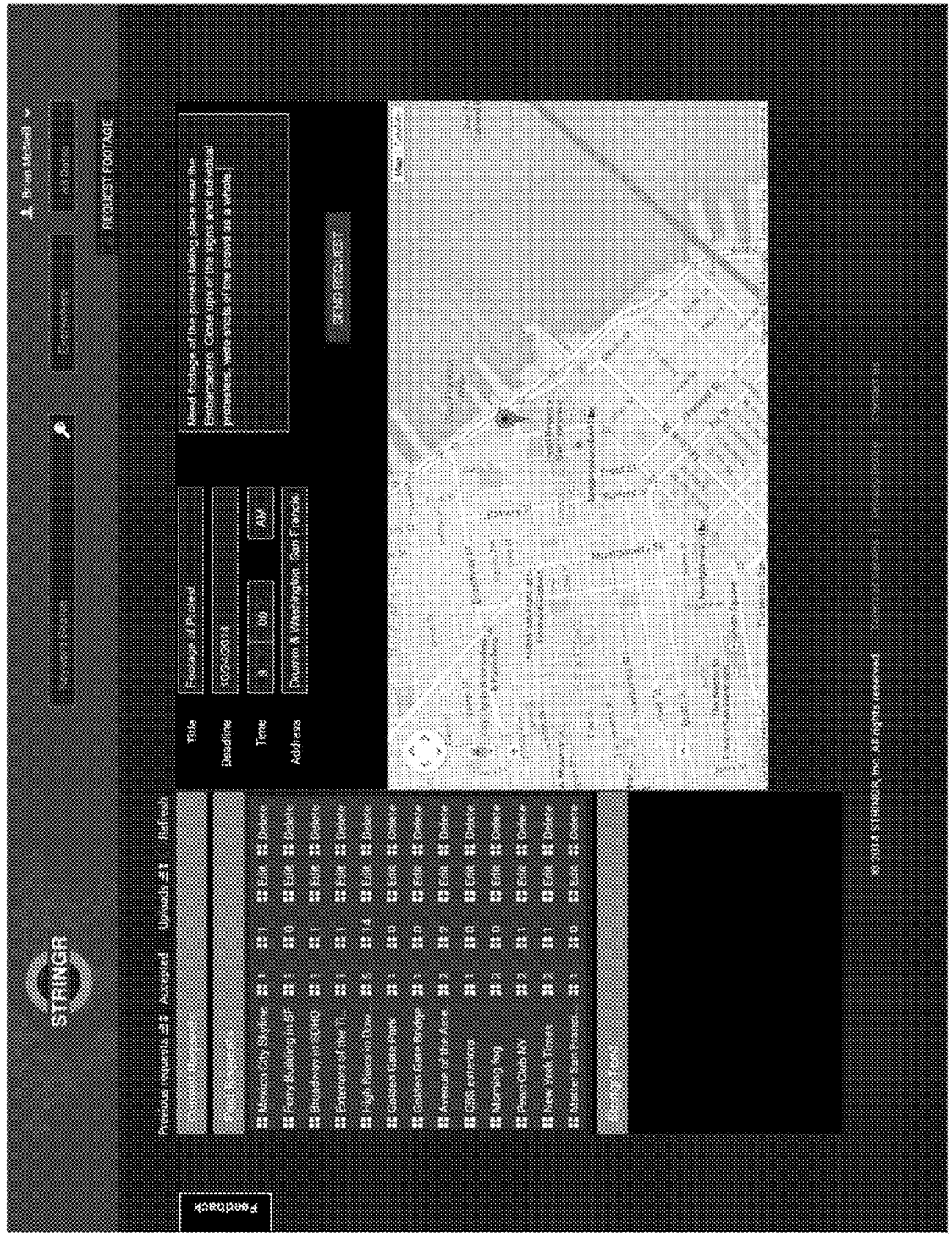

FIG. 12 depicts an example UI screen for display on a video buyer computer that provides a video buyer with a capability to formulate and submit a video footage request The UI screen of FIG. 12 may include fields for user entry to define a title for the footage request, a deadline for the footage request (which may include a date and/or time to be used as time field 710), and an address for the footage request (for use as location field 356). The UI screen of FIG. 12 may also include a map display. Through the map display, a user can also drop a pin on a desired location to define the location that will automatically populate the address field for the footage request. The UI screen of FIG. 12 may also include a user entry field for a description of the video sought via the footage request (for use as description field 354). Thus, FIG. 12 shows a UI screen that provides a video buyer with an effective capability for submitting detailed video footage requests.

Figure 13:
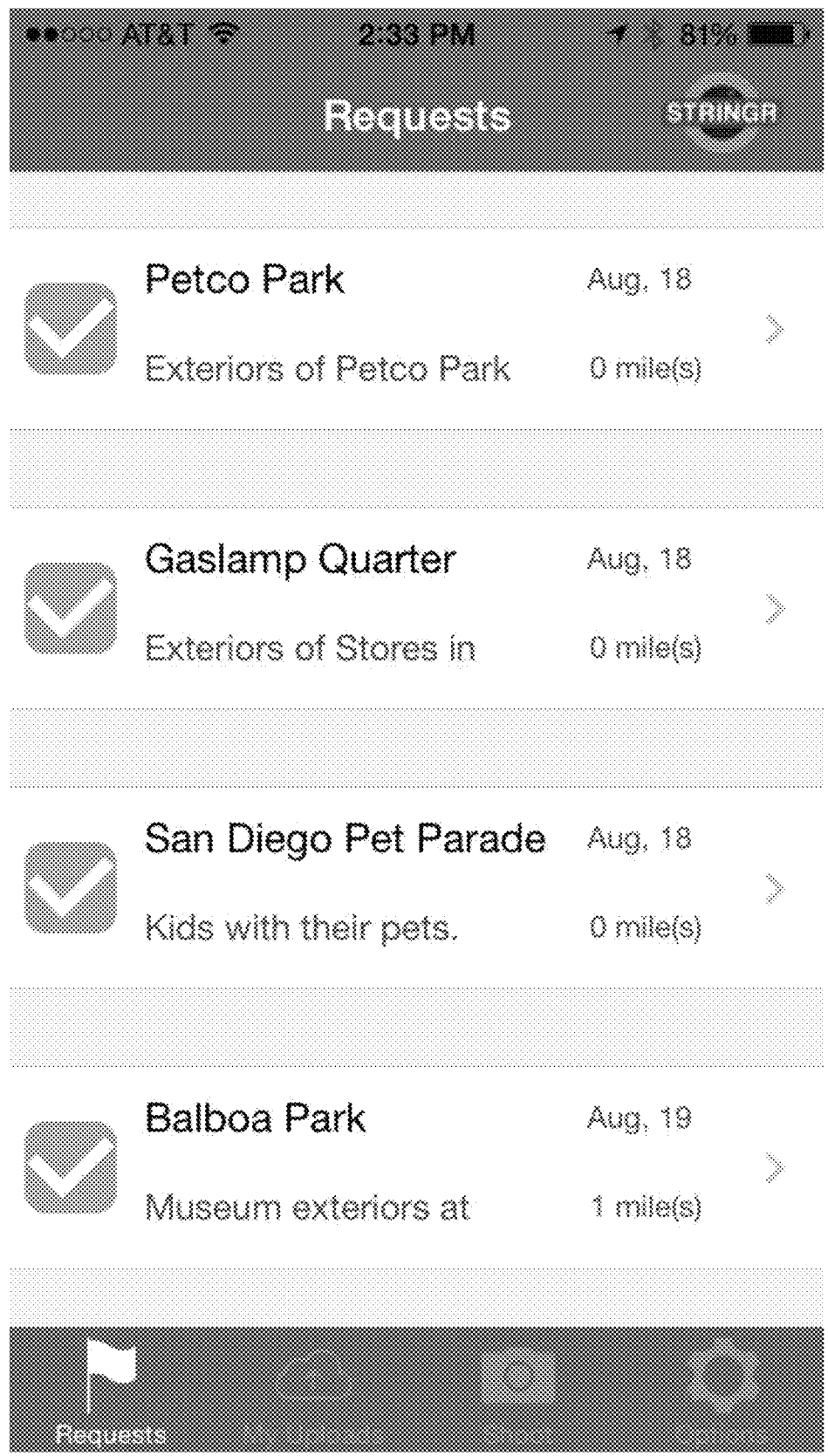
FIGS. 13-18 depict examples of UI screens for display on a mobile computing device of a videographer according to an example embodiment.

FIG. 13 depicts an example of a UI screen for display on a videographer's GPS-enabled mobile computing device. The UI screen of FIG. 13 provides a list of the footage requests that have been communicated to the videographer. Each footage request can be identified by its title, description, deadline, and a distance between the videographer's current location and the location for the footage request. The mobile computing device 800 can compute this distance upon receipt of a footage request based on the GPS-enabled mobile computing device's current location relative to the location from the footage request. Each footage request on the list can be user-selectable via a checkbox area for the videographer to accept the footage request. Each footage request on the list can also be user-selectable via an element such as the arrow shown at right for accessing additional details about the footage request. A navigational bar at the bottom of the UI screen shown by FIG. 13 permits the videographer to access a list of footage requests (shown by FIG. 13), a list of video uploads by the videographer (see FIG. 18), a video shooting UI (which is configured to permit the videographer to activate the video camera features of the mobile computing device in response and to user input), an options screen. The options screen can be configured to permit the videographer to define elements of a videographer profile such as a radius of interest and/or operating hours.

Figure 14:
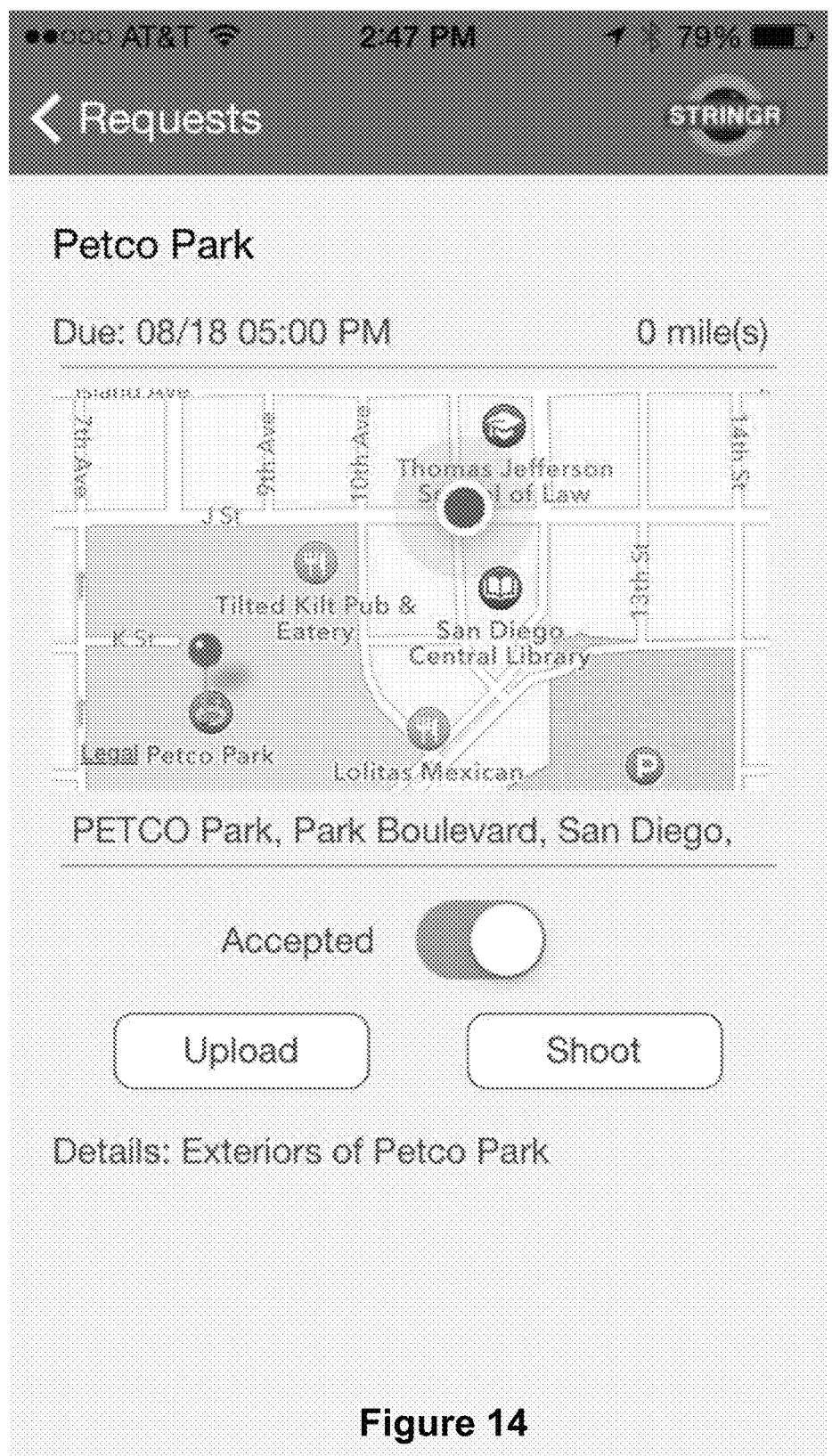

FIG. 14 depicts an example of a UI screen for display on a videographer's GPS-enabled mobile computing device that provides a detailed view of a specific footage request. In addition to the information provided by the UI screen of FIG. 13 about a footage request, FIG. 14 can also include a map display that shows where the footage request is located relative to the videographer's current position. A mechanism can be provided for a user to accept the footage request. Furthermore, mechanisms can be provided for the user to access an upload screen with respect to the footage request and a shooting screen with respect to the footage request.

Figure 15:
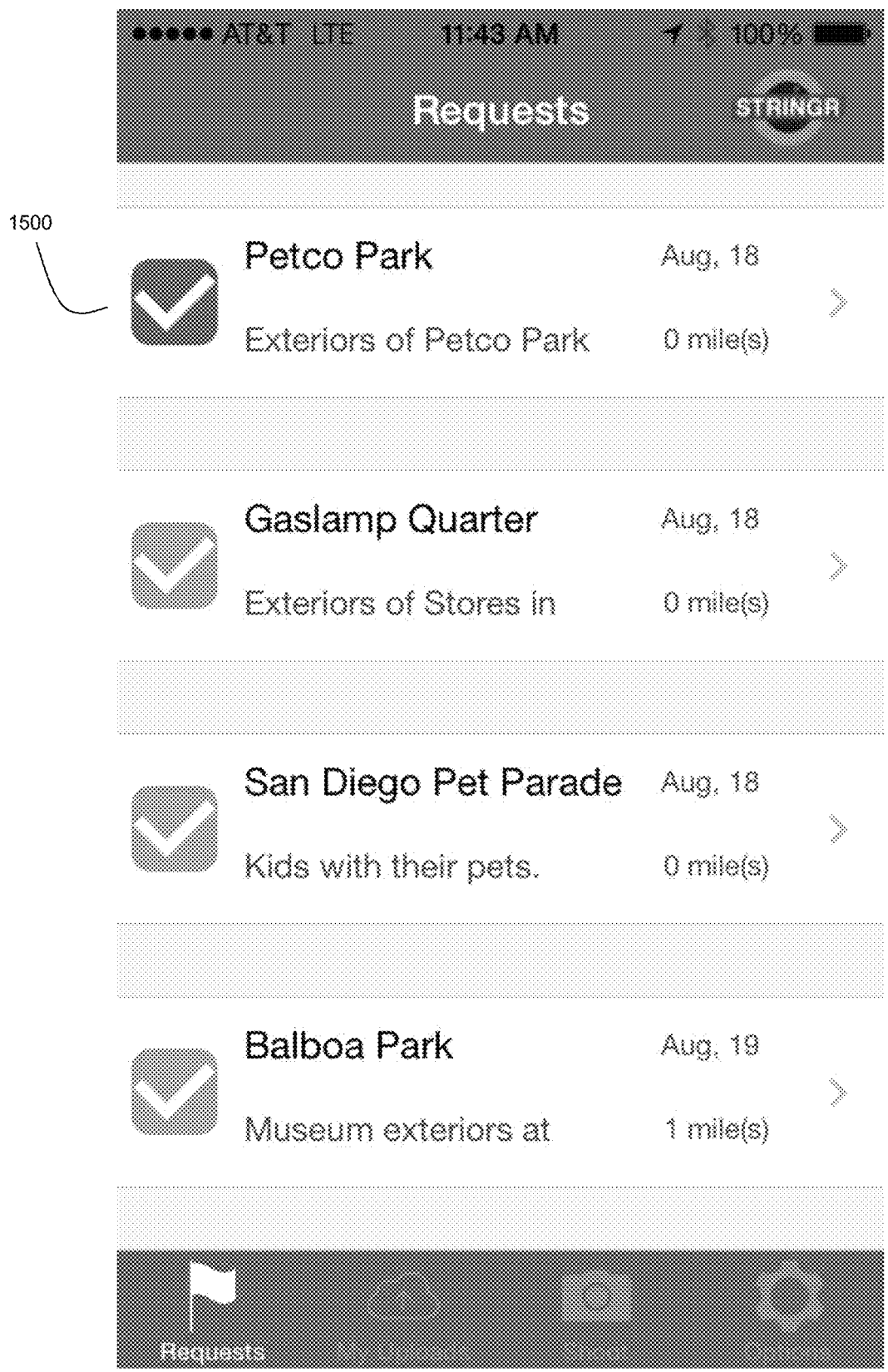

FIG. 15 depicts the UI screen of FIG. 12 updated to reflect an acceptance by the user of the first listed footage request (1500).

Figure 16:
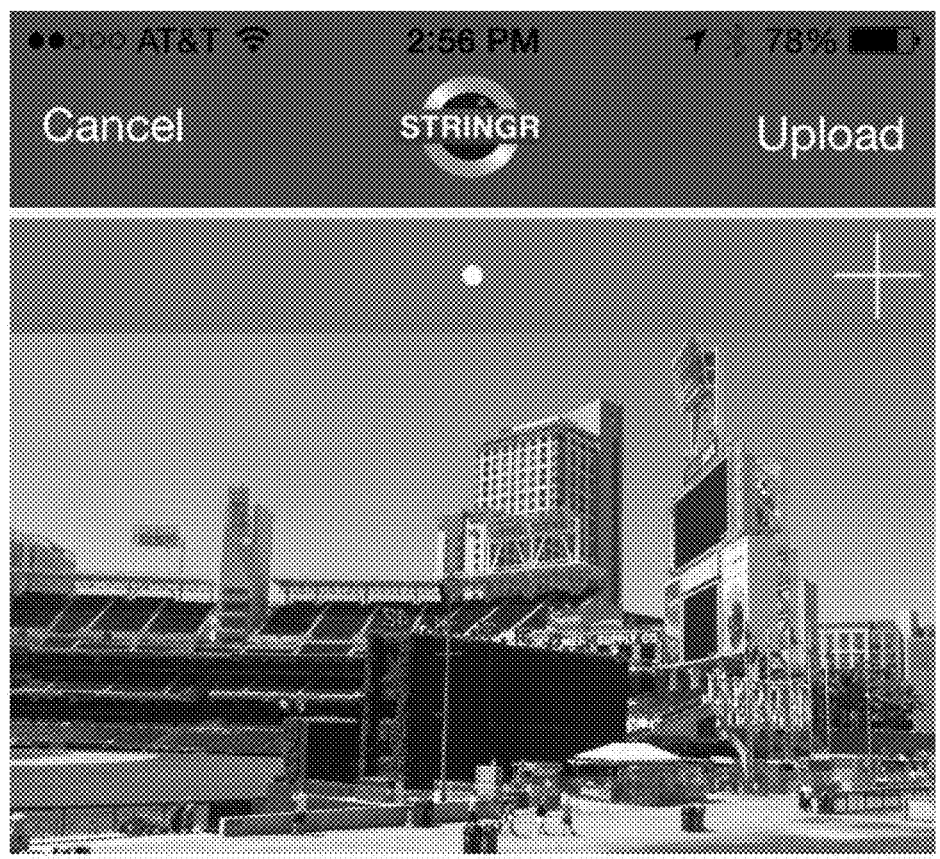
Figure 17:
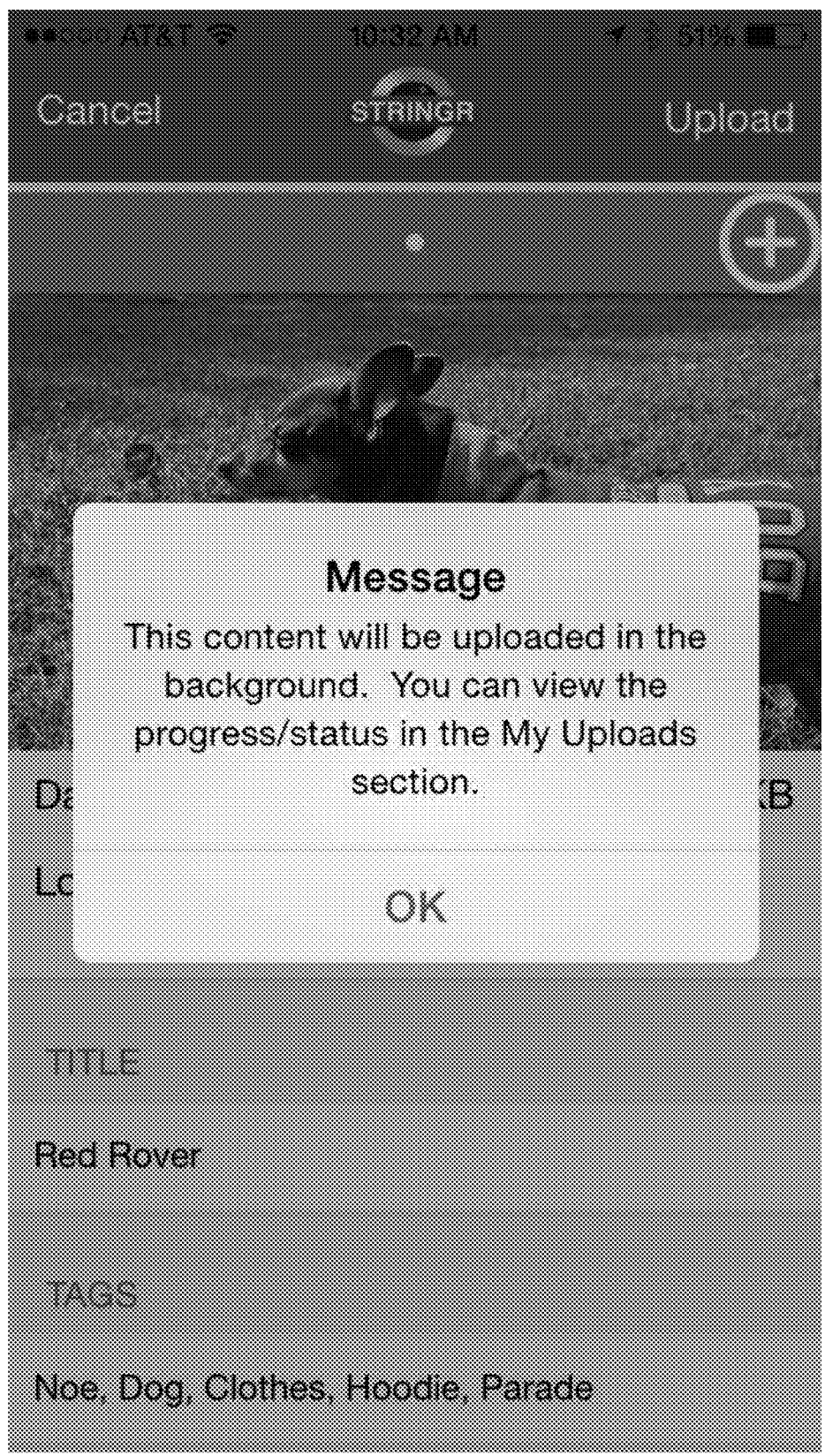

FIG. 16 depicts an example of a UI screen for display on a videographer's GPS-enabled mobile computing device that permits a videographer to tag a video prior to upload. The UI screen of FIG. 16 depicts various items of metadata for a video, including date, size, location, title, and keyword tags. The location data can be automatically defined by the GPS component of the device 800 when the video is generated. The title and keyword tags can be automatically populated based on the like information in the footage request to which the video is responsive. However, it should be understood that the videographer can be given the option of changing the title and/or keyword tags. The UI screen of FIG. 17 can be presented when a videographer selects the upload button shown by FIG. 16.

Figure 18:
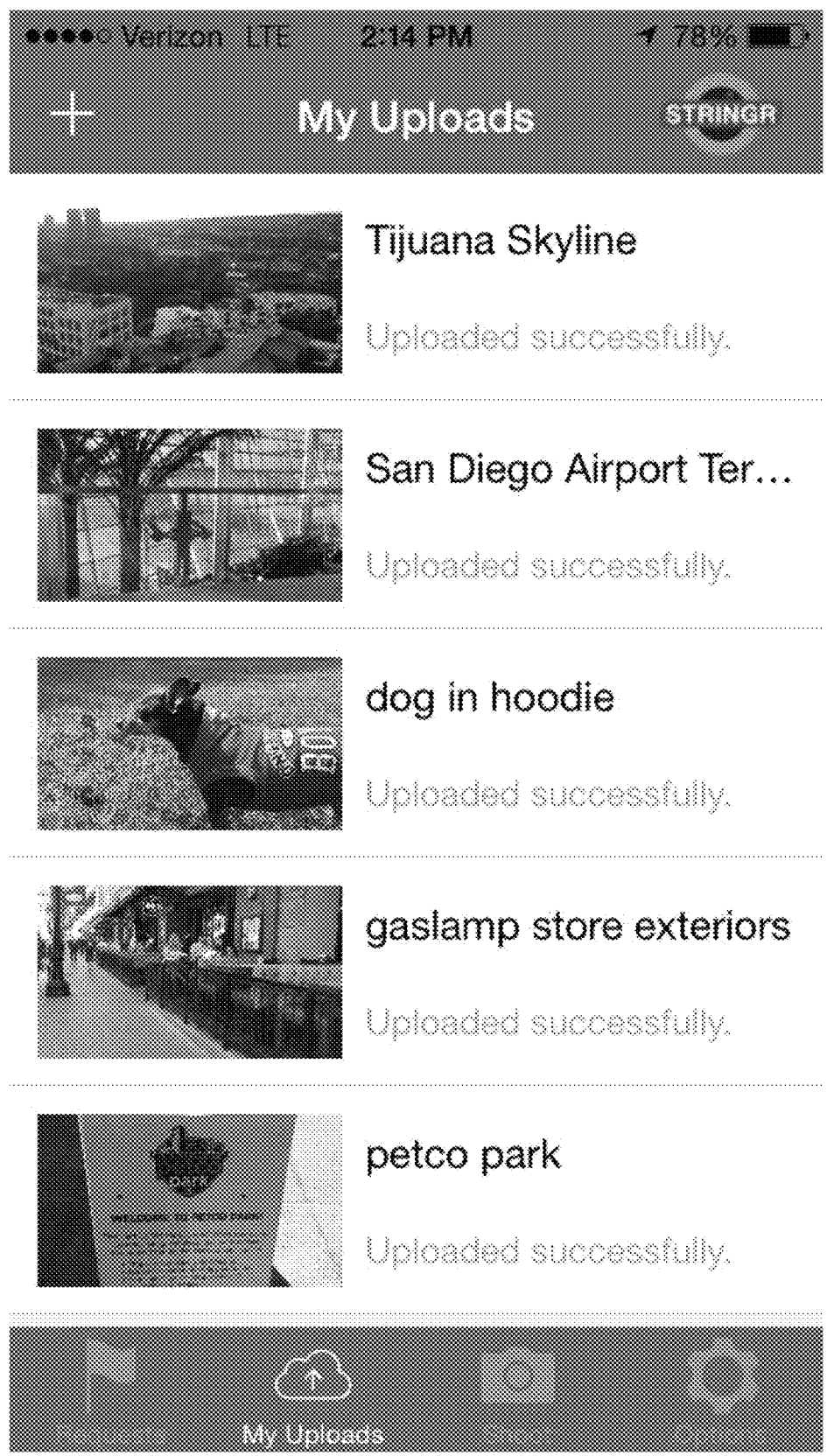

FIG. 18 depicts an example of a UI screen for display on a videographer's GPS-enabled mobile computing device that provides a list of recent video uploads by the videographer. Each video upload can be identified by a thumbnail screenshot, title, and an indication of whether the upload to the server was successful. Each listed video upload can be user-selectable to access a details screen for a selected video upload similar to that shown by FIG. 16.

Figure 19:
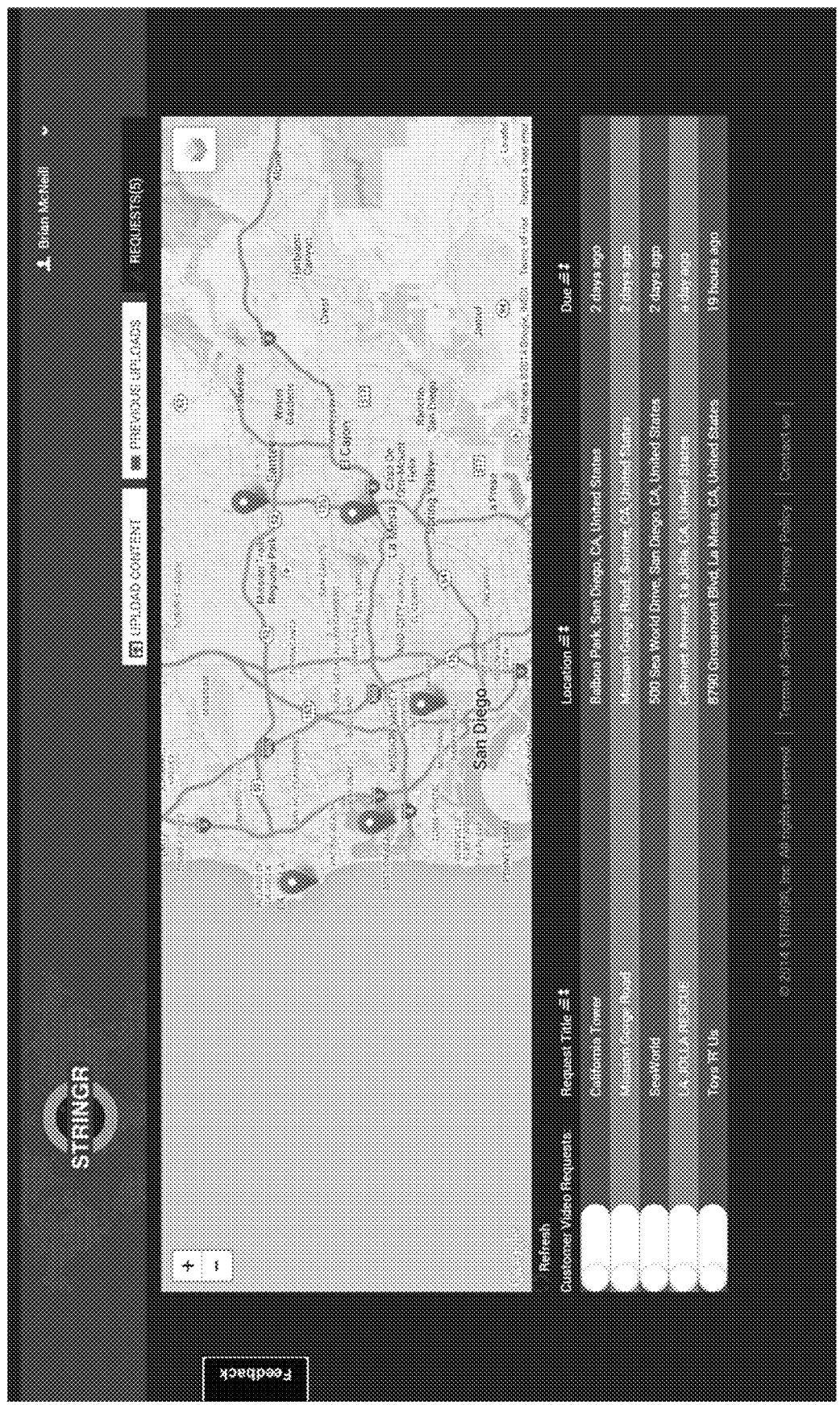
FIGS. 19 and 20 depict examples of website UI screens for display on a videographer computer according to an example embodiment.
Figure 20:

It should be understood that some videographers may choose to either use a camera other than the camera available on their mobile computing device to capture video or load the video generated by their mobile computing device onto another computer for editing thereof prior to upload. To accommodate such videographers, the server 102 can also provide a web interface for videographers in addition to a mobile interface. FIG. 19 depicts an example of a UI screen for a web interface for access by a videographer computer such as a desktop computer. Through the UI screen of FIG. 19, a videographer can review a list of footage requests assigned to the videographer that is similar in nature to FIG. 13. The UI screen of FIG. 19 may also include a map display that identifies the location for each listed footage request. Through the UI screen of FIG. 20, a videographer can view the details for a specific footage request, which is similar in nature to FIG. 14. FIG. 20 also includes a map display that shows the location for that footage request. The web interface may also include UI screens similar in nature to FIGS. 16 and 18.

It should be understood that more, fewer, and/or different UI screens can be used by the video buyer computers 104 and videographer computers 106 depending upon the desires of a practitioner.

While the present invention has been described above in relation to example embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. A system for interconnecting a plurality of image providers with an image requester, the system comprising:
   a plurality of mobile computing devices associated with a plurality of image providers, each mobile computing device including a GPS receiver and a mobile application;
   a first computer system associated with an image requester; and
   a second computer system for communicating with the mobile computing devices and the first computer system;
   wherein the mobile application, upon execution by its mobile computing device, is configured to, on a repeating basis, (1) interact with its mobile computing device's GPS receiver to determine its current location and (2) wirelessly report its determined current location to the second computer system;
   wherein the second computer system is configured to (1) receive the current locations from the mobile computing devices and (2) maintain a database that tracks a current location for each of the mobile computing devices;
   wherein the first computer system is configured to communicate an image request to the second computer system, the image request including a location and a description of sought image data;
   wherein the second computer system is further configured to automatically (1) determine an image request type characteristic for the image request, (2) access historical data that tracks how image providers have accepted prior image requests as a function of a plurality of types for the accepted prior image requests, (3) filter the mobile computing devices based on filtration criteria, wherein the filtration criteria comprises an estimated propensity of the image providers to accept the image request, wherein the estimated propensity is based on the current locations in the database for the mobile computing devices associated with the image providers and the accessed historical data so that the second computer system uses the historical data that tracks how image providers have accepted prior image requests as a function of a plurality of types for the accepted prior image requests as compared to the determined image request type characteristic as an indicator for assessing the estimated propensity of a plurality of the image providers for accepting the image request, (4) identify a subset of the mobile computing devices in response to the filter, and (5) communicate the image request to the identified subset of mobile computing devices; and
   wherein each mobile computing device within the identified subset which received the communicated image request is configured to notify its associated image provider about the received image request.

2. The system of claim 1 wherein the filtration criteria further comprises a requirement that a time associated with the image request is within a time window defined by an image provider-specific operational time availability.

3. The system of claim 1 wherein the filtration criteria further comprises an estimated suitability for the image providers with respect to fulfillment of the image request, wherein the estimated suitability is based on historical data about the image providers with respect to prior responses to prior image requests.

4. The system of claim 3 wherein the historical data further tracks at least one of (1) how well images from a plurality of the image providers have sold in the past, (2) how well images from a plurality of the image providers have been regarded by evaluators, and/or (3) quality grades for a plurality of the image providers; and
   wherein the second computer system is further configured to use the historical data as an indicator for assessing the estimated suitability of a plurality of the image providers with respect to fulfillment of the image request.

5. The system of claim 3 wherein historical data further tracks at least one of (1) how well images from a plurality of the image providers have sold in the past as a function of a type of image, (2) how well images from a plurality of the image providers have been regarded by evaluators as a function of a type of image, and/or (3) quality grades for a plurality of the image providers as a function of a type of image; and wherein the second computer system is further configured to use the historical data, including the historical data that tracks how image providers have accepted prior image requests as a function of a plurality of types for the accepted prior image requests, as an indicator for assessing the estimated suitability of a plurality of the image providers with respect to fulfillment of the image request.

6. The system of claim 1 wherein the estimated propensity factors in an estimated distance or travel time for traveling from (1) the current locations of the mobile computing devices associated with the image providers as reflected in the database to (2) the image request location.

7. The system of claim 6 wherein the second computer system is further configured to access a GIS system to determine the estimated distance or travel times.

8. The system of claim 1 further comprising a plurality of first computer systems to thereby provide a plurality of image requesters with access to the image providers via the second computer system.

9. The system of claim 8 wherein the second computer system is further configured to (1) receive a plurality of image files from a plurality of the mobile computing devices, the image files including metadata about the image files, (2) store the received image files in a database indexed by their respective metadata, and (3) communicate a plurality of notifications about the stored image files to the first computer systems associated with the image requesters from which the image requests corresponding to the stored image files were received.

10. The system of claim 9 wherein the image files comprise a plurality of video files; and wherein the second computer system is further configured to (1) automatically transcode the video files to generate copies of the video files in a streaming format, (2) automatically transcode the video files to generate copies of the video files in a high definition format, and (3) store the video files in the streaming format and the video files in the high definition format in the database, each indexed by the metadata.

11. The system of claim 10 wherein the metadata for a video file includes at least one of (1) a location where the video file was shot, (2) an identifier for the image provider who shot the video file, (3) a plurality of words indicative of content depicted by the video file, (4) time data indicative of when the video file was shot, and (5) an identifier for the image request to which the video file is responsive.

12. The system of claim 10 wherein the second computer system is further configured to:

receive a preview request for a video file in the database from a video requester computer; and in response to the received preview request, communicate at least a portion of the video file in the streaming format to the video requester computer.

13. The system of claim 12 wherein the second computer system is further configured to:

receive a purchase request for a video file in the database from a video requester computer;

in response to the received purchase request, communicate a copy of the video file in the high definition format to the video requester computer.

14. The system of claim 8 wherein the filtration criteria further comprises a requirement that, for each of a plurality of the image providers, the current location for the mobile computing device associated with that image provider as reflected in the database is within a zone defined by image requester-specific data indicative of a distance or time for travel with respect to the request location.

15. The system of claim 14 wherein second computer system is further configured to (1) maintain a database that stores a plurality of data values corresponding to the image requester-specific data, each data value associated with at least one of the image requesters such that a plurality of the image requesters are associated with a plurality of different data values, (2) receive and process a plurality of the image requests from a plurality of the image requesters, and (3) for each of a plurality of the received image requests, (i) determine the image requester for that image request, (ii) retrieve the stored data value associated with the determined image requester, and (iii) compute the zone for that image request based on the retrieved data value and the request location.

16. The system of claim 1 wherein the second computer system comprises a server.

17. The system of claim 16 wherein the server and the first computer system are operated by the same entity.

18. The system of claim 1 wherein the first and second computer systems are operated by different entities.

19. The system of claim 1 wherein the mobile application, upon execution by its mobile computing device, is further configured to:

interact with a wireless transmitter of its mobile computing device to wirelessly send a plurality of messages that include the determined current locations on the repeating basis to the second computer system as its mobile computing device moves over time; and wherein the second computer system is configured to update the database based on the messages.

20. The system of claim 1 wherein the mobile application, upon execution by its mobile computing device, is further configured to:

interact with a wireless receiver of its mobile computing device to receive the image request;

process the received image request to generate data about the image request for presentation to a user of its mobile computing device; and interact with a display interface of its mobile computing device to present the generated data about the image request to the user via a display of its mobile computing device.

21. The system of claim 20 wherein the mobile application, upon execution by its mobile computing device, is further configured to:

interact with an input interface of its mobile computing device to receive input from the user indicative of an acceptance by the user of the image request; and interact with a wireless transmitter of its mobile computing device to communicate an acceptance message for the image request to the second computer system.

22. The system of claim 20 wherein the mobile application, upon execution by its mobile computing device, is further configured to:

interact with a camera of its mobile computing device to activate the camera for capturing an image of a person, place, or event that is responsive to the image request; and interact with a memory of its mobile computing device to store the image as an image file in the memory.

23. The system of claim 22 wherein the mobile application, upon execution by its mobile computing device, is further configured to:

interact with the memory of its mobile computing device to identify an image file in the memory for upload to the second computer system; and interact with a wireless transmitter of its mobile computing device to upload the identified image file to the second computer system.

24. The system of claim 23 wherein the mobile application, upon execution by its mobile computing device, is further configured to:

tag the identified image file with metadata, the metadata including at least one of (1) a location where the identified image file was shot, (2) an identifier for the user who shot the identified image file, (3) a plurality of words indicative of content depicted by the identified image file, (4) time data indicative of when the identified image file was shot, and (5) an identifier for an image request to which the identified image file is responsive, and wherein the uploaded image file includes the tagged metadata.

25. The system of claim 1 wherein the filtration criteria further comprises a requirement that, for each of a plurality of the image providers, the request location is within a zone defined by image provider-specific data indicative a distance or time that image provider is willing to travel from the current location of the mobile computing device associated with that image provider as reflected in the database.

26. The system of claim 25 wherein the database is further configured to store a plurality of data values associated with a plurality of the image providers, wherein the data values correspond to the image provider-specific data; and wherein the second computer system is further configured to compute the zones based on the image provider data values and the current locations from the database.

27. The system of claim 1 wherein the filtration criteria further comprises a requirement that, for each of a plurality of the image providers, the current location for the mobile computing device associated with that image provider as reflected in the database is within a zone defined by image request-specific data indicative of a distance or time for travel with respect to the request location.

28. The system of claim 27 wherein second computer system is further configured to (1) receive and process a plurality of the image requests, each of a plurality of the image requests including a field that defines the image request-specific data, wherein a plurality of the different image requests include different data values in the field that defines the image request-specific data, (2) extract the data values from the fields, and (3) compute the zones for the image requests based on the extracted data values and the request locations.

29. The system of claim 1 wherein the historical data further tracks how image providers have accepted prior image requests as a function of distance from locations for the accepted prior image requests relative to the then current locations for the mobile computing devices of those image providers at a time of the accepted prior image requests; and wherein the second computer system is further configured to use the distance function data as another indicator for assessing the estimated propensity of a plurality of the image providers for accepting the image request.

30. The system of claim 29 wherein the historical data further tracks how image providers have accepted prior image requests as a function of time of day and/or day of week for the accepted prior image requests; and wherein the second computer system is further configured to use the time of day and/or day of week function data as another indicator for assessing the estimated propensity of a plurality of the image providers for accepting the image request.

31. The system of claim 30 wherein the second computer system is further configured to (1) determine a plurality of characteristics for the image request, including a location characteristic for the image request, the image request type characteristic for the image request, and a time of day and/or time of week characteristic for the image request and (2) determine the estimated propensity to accept the image request based on the determined characteristics, (ii) the distance function data, (iii) the historical data that tracks how image providers have accepted prior image requests as a function of a plurality of types for the accepted prior image requests, and (iv) the time of day and/or day of week function data.

32. The system of claim 29 wherein the second computer system is further configured to (1) determine a plurality of characteristics for the image request, including a location characteristic for the image request and the image request type characteristic for the image request and (2) determine the estimated propensity to accept the image request based on the determined characteristics, (ii) the distance function data, and (iii) the historical data that tracks how image providers have accepted prior image requests as a function of a plurality of types for the accepted prior image requests.

33. The system of claim 1 wherein the types for previously accepted image requests include crime, weather, and sports.

34. The system of claim 1 wherein the historical data further tracks how image providers have accepted prior image requests as a function of time of day and/or day of week for the accepted prior image requests; and wherein the second computer system is further configured to use the time of day and/or day of week function data as another indicator for assessing the estimated propensity of a plurality of the image providers for accepting the image request.

35. The system of claim 1 wherein the database tracks the current locations for the mobile computing devices using latitude and longitude coordinates.

36. The system of claim 1 wherein the types for previously accepted image requests include weather and sports.

37. The system of claim 1 wherein the types for previously accepted image requests include crime and weather.

38. The system of claim 1 wherein the types for previously accepted image requests include crime and sports.

39. A system for interconnecting a plurality of GPS-enabled mobile computing devices associated with a plurality of image providers with a plurality of computers associated with a plurality of image requesters, the system comprising:

a plurality of mobile applications for execution by the GPS-enabled mobile computing devices;

a plurality of software applications for execution by the image requester computers; and a server computer system for communication with the mobile applications and the software applications via a communications network;

wherein the mobile applications are configured to cause the GPS-enabled mobile computing devices to output a plurality of wireless messages that update the server computer system about a current location for the GPS-enabled mobile computing devices on a repeating basis over time as the GPS-enabled mobile computing devices move over time;

wherein the server computer system is configured to (1) receive the current location messages from the mobile applications and (2) maintain a database that tracks a current location for each of the GPS-enabled mobile computing devices;

wherein the software applications are configured to cause the image requester computers to communicate a plurality of image requests to the server computer system, each image request including a location and a description of sought image data; and wherein the server computer system is further configured to, for each received image request, automatically (1) determine an image request type characteristic for the image request, (2) access historical data that tracks how image providers have accepted prior image requests as a function of a plurality of types for the accepted prior image requests, (3) filter the GPS-enabled mobile computing devices based on filtration criteria, wherein the filtration criteria comprises an estimated propensity of the image providers to accept the image request, wherein the estimated propensity is based on the current locations in the database for the mobile computing devices associated with the image providers and the accessed historical data so that the server computer system uses the historical data that tracks how image providers have accepted prior image requests as a function of a plurality of types for the accepted prior image requests as compared to the determined image request type characteristic as an indicator for assessing the estimated propensity of a plurality of the image providers for accepting the image request, (4) identify a subset of the GPS-enabled mobile computing devices in response to the filter, and (5) communicate that image request to the identified subset of GPS-enabled mobile computing devices.

40. The system of claim 39 wherein the server computer system is further configured to (1) receive a plurality of image files from a plurality of the GPS-enabled mobile computing devices, the image files including metadata about the image files, (2) store the received image files in a database indexed by their respective metadata, and (3) communicate a plurality of notifications about the stored image files to the image requester computers from which the image requests corresponding to the stored image files were received.

41. The system of claim 39 wherein the historical data further tracks how image providers have accepted prior image requests as a function of distance from locations for the accepted prior image requests relative to the then current locations for the mobile computing devices of those image providers at a time of the accepted prior image requests; and wherein the server computer system is further configured to use the distance function data as another indicator for assessing the estimated propensity of a plurality of the image providers for accepting the image request.

42. The system of claim 39 wherein the types for previously accepted image requests include crime, weather, and sports.

43. The system of claim 39 wherein the historical data further tracks how image providers have accepted prior image requests as a function of time of day and/or day of week for the accepted prior image requests; and wherein the server computer system is further configured to use the time of day and/or day of week function data as another indicator for assessing the estimated propensity of a plurality of the image providers for accepting the image request.

44. The system of claim 39 wherein the database tracks the current locations for the mobile computing devices using latitude and longitude coordinates.

45. The system of claim 39 wherein the types for previously accepted image requests include weather and sports.

46. The system of claim 39 wherein the types for previously accepted image requests include crime and weather.

47. The system of claim 39 wherein the types for previously accepted image requests include crime and sports.

\* \* \* \* \*